US012581464B2

(12) United States Patent
Gao et al.

(10) Patent No.: US 12,581,464 B2
(45) Date of Patent: Mar. 17, 2026

(54) INFORMATION TRANSMISSION METHOD AND APPARATUS

(71) Applicant: HUAWEI TECHNOLOGIES CO., LTD., Shenzhen (CN)

(72) Inventors: Lei Gao, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 530 days.

(21) Appl. No.: 18/148,685

(22) Filed: Dec. 30, 2022

(65) Prior Publication Data

US 2023/0142451 A1 May 11, 2023

Related U.S. Application Data

(63) Continuation of application No. PCT/CN2020/106457, filed on Jul. 31, 2020.

(30) Foreign Application Priority Data

Jul. 1, 2020 (WO) ............... PCT/CN2020/099804

(51) Int. Cl.
*H04W 72/044* (2023.01)

(52) U.S. Cl.
CPC ................................. *H04W 72/044* (2013.01)

(58) Field of Classification Search
CPC .... H04W 72/04; H04W 72/044; H04W 72/11
See application file for complete search history.

(56) References Cited

U.S. PATENT DOCUMENTS

| 2015/0215860 | A1 | 7/2015 | Akkapally et al. |
| 2018/0007543 | A1 | 1/2018 | Lee et al. |
| 2018/0376454 | A1* | 12/2018 | Åström ............. H04W 72/0446 |
| 2019/0335469 | A1 | 10/2019 | Si et al. |
| 2020/0045708 | A1 | 2/2020 | Hwang et al. |
| 2020/0136739 | A1 | 4/2020 | Si et al. |
| 2020/0162222 | A1* | 5/2020 | Liu ........................ H04L 5/0053 |
| 2022/0086918 | A1* | 3/2022 | Liu ........................ H04W 24/08 |

(Continued)

FOREIGN PATENT DOCUMENTS

| CN | 109392139 A | 2/2019 |
| CN | 109586863 A | 4/2019 |

(Continued)

OTHER PUBLICATIONS

Samsung, "Numerology configuration in NR," 3GPP TSG-RAN WG2 NR #99bis Meeting, R2-1711193, Prague, Czech, Oct. 9-13, 2017, 7 pages.

(Continued)

*Primary Examiner* — Phong La

(74) *Attorney, Agent, or Firm* — Fish & Richardson P.C.

(57) ABSTRACT

Embodiments of the present invention provide an information transmission method and an apparatus One example method includes: sending a first signal on a first time-frequency resource through a first antenna port, where the first signal is used for synchronization; sending a first message on a second time-frequency resource, where the first message includes time domain resource information and/or cyclic prefix length information of the second time-frequency resource; and sending a second message on a third time-frequency resource.

25 Claims, 11 Drawing Sheets

(56) References Cited

U.S. PATENT DOCUMENTS

| | | | | |
|---|---|---|---|---|
| 2022/0217689 A1* | 7/2022 | Tian | ..................... | H04W 48/12 |
| 2023/0142451 A1* | 5/2023 | Gao | ..................... | H04L 5/0048 |
| 2023/0284192 A1* | 9/2023 | Zhou | .................. | H04W 64/003 |
| | | | | 370/329 |

FOREIGN PATENT DOCUMENTS

| | | | | | |
|---|---|---|---|---|---|
| CN | 110447286 A | | 11/2019 | | |
| CN | 110945936 A | | 3/2020 | | |
| CN | 108370565 B | | 12/2020 | | |
| JP | 2020532892 A | | 11/2020 | | |
| WO | WO-2019213977 A1 * | | 5/2018 | .......... | H04W 74/002 |
| WO | WO-2019192345 A1 * | | 3/2019 | .......... | H04W 74/002 |
| WO | WO-2019183905 A1 * | | 10/2019 | .......... | H04J 11/0069 |
| WO | WO-2020005133 A1 * | | 1/2020 | | |
| WO | WO-2020025061 A1 * | | 2/2020 | ........... | H04B 7/0626 |
| WO | WO 2021196232 A1 * | | 4/2020 | ........... | H04L 69/324 |

OTHER PUBLICATIONS

Zte et al., "Comments on Draft TP to TR 38.807-Use Cases and Deployment Scenarios," 3GPP TSG RAN Meeting #85, RP-191836, Newport Beach, USA, Sep. 16-20, 2019, 12 pages.

Office Action in Japanese Appln. No. 2022-581393, mailed on Feb. 6, 2024, 8 pages (with English translation).

International Search Report and Written Opinion in International Appln. No. PCT/CN2020/106457, mailed on Mar. 29, 2021, 16 pages (with English translation).

Extended European Search Report in European Appln No. 20942494. 4, dated Nov. 8, 2023, 11 pages.

* cited by examiner

U: uplink transmission symbol
D: downlink transmission symbol

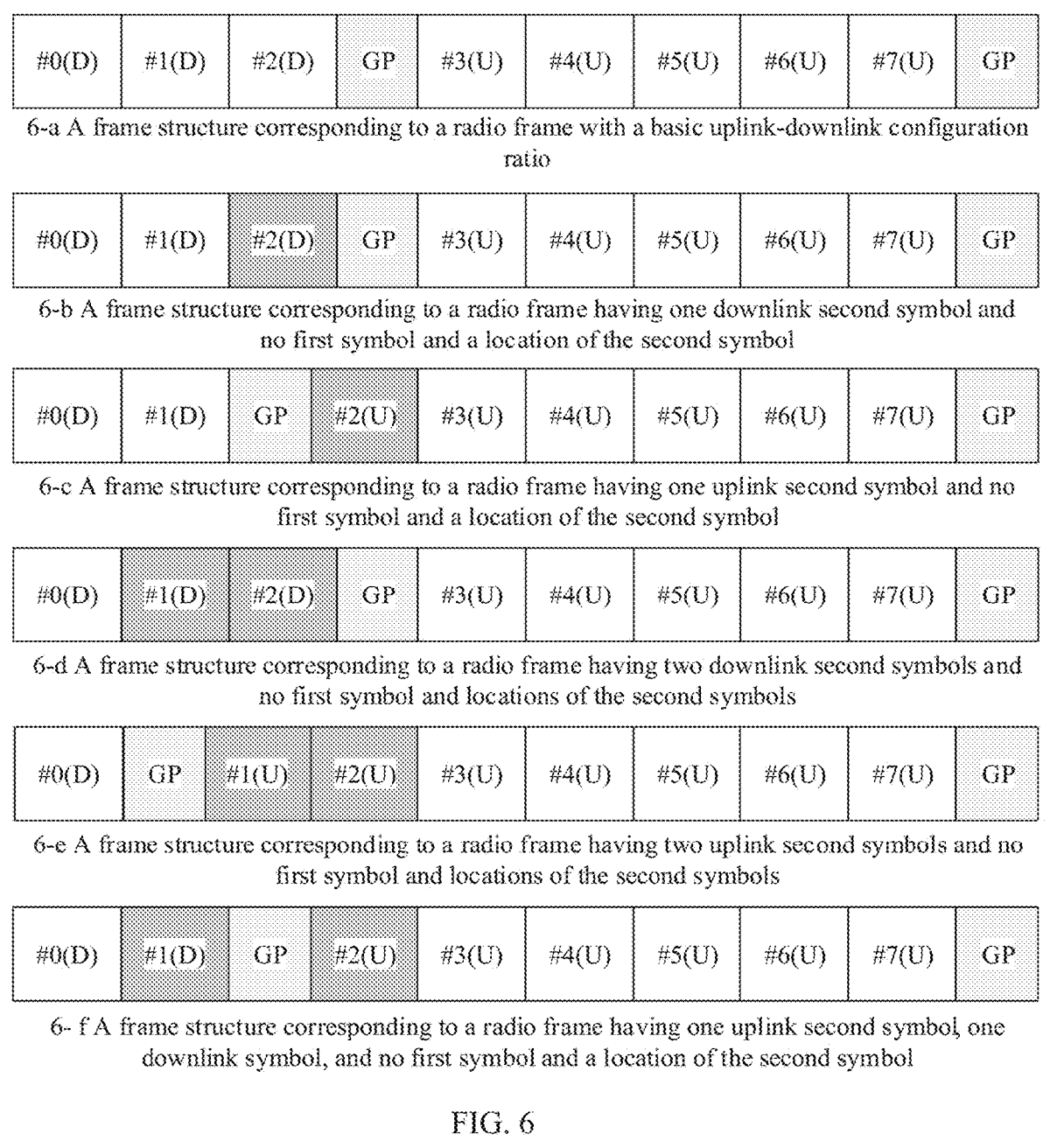

| #0(D) | #1(D) | #2(D) | GP | #3(U) | #4(U) | #5(U) | #6(U) | #7(U) | GP |
|-------|-------|-------|----|-------|-------|-------|-------|-------|----|

6-a A frame structure corresponding to a radio frame with a basic uplink-downlink configuration ratio

| #0(D) | #1(D) | #2(D) | GP | #3(U) | #4(U) | #5(U) | #6(U) | #7(U) | GP |
|-------|-------|-------|----|-------|-------|-------|-------|-------|----|

6-b A frame structure corresponding to a radio frame having one downlink second symbol and no first symbol and a location of the second symbol

| #0(D) | #1(D) | GP | #2(U) | #3(U) | #4(U) | #5(U) | #6(U) | #7(U) | GP |
|-------|-------|----|-------|-------|-------|-------|-------|-------|----|

6-c A frame structure corresponding to a radio frame having one uplink second symbol and no first symbol and a location of the second symbol

| #0(D) | #1(D) | #2(D) | GP | #3(U) | #4(U) | #5(U) | #6(U) | #7(U) | GP |
|-------|-------|-------|----|-------|-------|-------|-------|-------|----|

6-d A frame structure corresponding to a radio frame having two downlink second symbols and no first symbol and locations of the second symbols

| #0(D) | GP | #1(U) | #2(U) | #3(U) | #4(U) | #5(U) | #6(U) | #7(U) | GP |
|-------|----|-------|-------|-------|-------|-------|-------|-------|----|

6-e A frame structure corresponding to a radio frame having two uplink second symbols and no first symbol and locations of the second symbols

| #0(D) | #1(D) | GP | #2(U) | #3(U) | #4(U) | #5(U) | #6(U) | #7(U) | GP |
|-------|-------|----|-------|-------|-------|-------|-------|-------|----|

6- f A frame structure corresponding to a radio frame having one uplink second symbol, one downlink symbol, and no first symbol and a location of the second symbol

FIG. 6

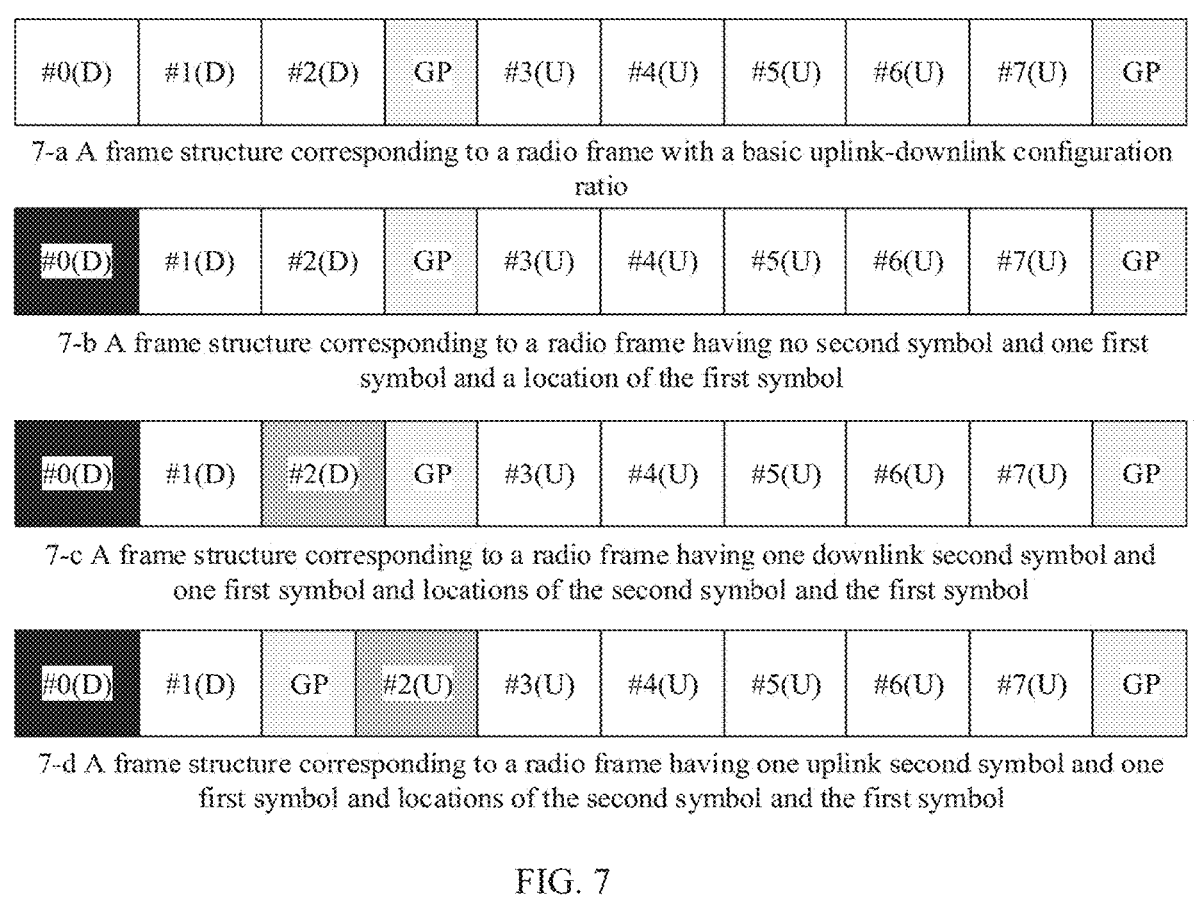

| #0(D) | #1(D) | #2(D) | GP | #3(U) | #4(U) | #5(U) | #6(U) | #7(U) | GP |
|-------|-------|-------|----|-------|-------|-------|-------|-------|----|

7-a A frame structure corresponding to a radio frame with a basic uplink-downlink configuration ratio

| #0(D) | #1(D) | #2(D) | GP | #3(U) | #4(U) | #5(U) | #6(U) | #7(U) | GP |
|-------|-------|-------|----|-------|-------|-------|-------|-------|----|

7-b A frame structure corresponding to a radio frame having no second symbol and one first symbol and a location of the first symbol

| #0(D) | #1(D) | #2(D) | GP | #3(U) | #4(U) | #5(U) | #6(U) | #7(U) | GP |
|-------|-------|-------|----|-------|-------|-------|-------|-------|----|

7-c A frame structure corresponding to a radio frame having one downlink second symbol and one first symbol and locations of the second symbol and the first symbol

| #0(D) | #1(D) | GP | #2(U) | #3(U) | #4(U) | #5(U) | #6(U) | #7(U) | GP |
|-------|-------|----|-------|-------|-------|-------|-------|-------|----|

7-d A frame structure corresponding to a radio frame having one uplink second symbol and one first symbol and locations of the second symbol and the first symbol

FIG. 7

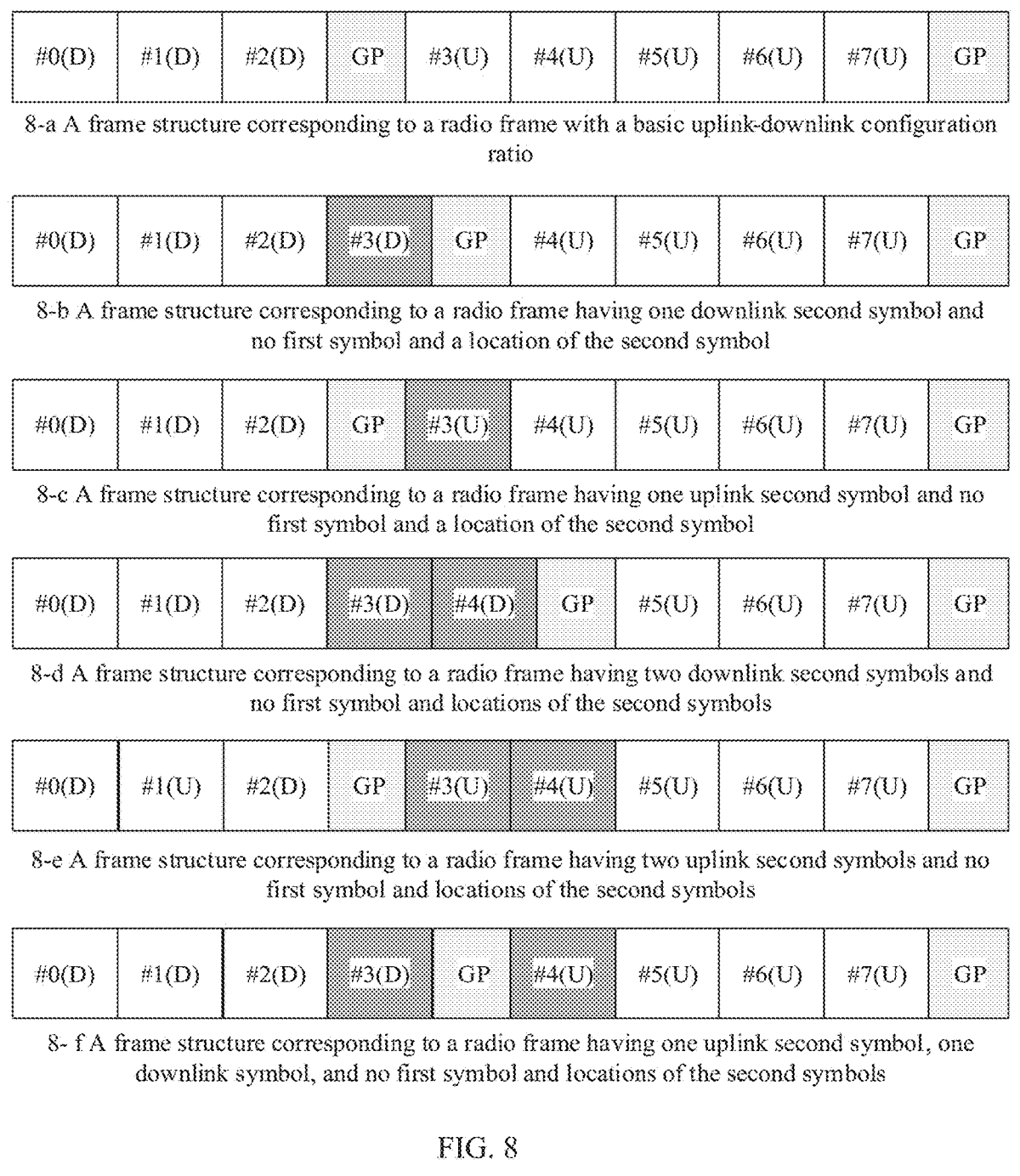

| #0(D) | #1(D) | #2(D) | GP | #3(U) | #4(U) | #5(U) | #6(U) | #7(U) | GP |

8-a A frame structure corresponding to a radio frame with a basic uplink-downlink configuration ratio

| #0(D) | #1(D) | #2(D) | #3(D) | GP | #4(U) | #5(U) | #6(U) | #7(U) | GP |

8-b A frame structure corresponding to a radio frame having one downlink second symbol and no first symbol and a location of the second symbol

| #0(D) | #1(D) | #2(D) | GP | #3(U) | #4(U) | #5(U) | #6(U) | #7(U) | GP |

8-c A frame structure corresponding to a radio frame having one uplink second symbol and no first symbol and a location of the second symbol

| #0(D) | #1(D) | #2(D) | #3(D) | #4(D) | GP | #5(U) | #6(U) | #7(U) | GP |

8-d A frame structure corresponding to a radio frame having two downlink second symbols and no first symbol and locations of the second symbols

| #0(D) | #1(U) | #2(D) | GP | #3(U) | #4(U) | #5(U) | #6(U) | #7(U) | GP |

8-e A frame structure corresponding to a radio frame having two uplink second symbols and no first symbol and locations of the second symbols

| #0(D) | #1(D) | #2(D) | #3(D) | GP | #4(U) | #5(U) | #6(U) | #7(U) | GP |

8- f A frame structure corresponding to a radio frame having one uplink second symbol, one downlink symbol, and no first symbol and locations of the second symbols

FIG. 8

| #0(D) | #1(D) | #2(D) | GP | #3(U) | #4(U) | #5(U) | #6(U) | #7(U) | GP |

9-a A frame structure corresponding to a radio frame with a basic uplink-downlink configuration ratio

| #0(D) | #1(D) | #2(D) | #3(D) | GP | #4(U) | #5(U) | #6(U) | #7(U) | GP |

9-b A frame structure corresponding to a radio frame having no second symbol and one first symbol and a location of the first symbol

| #0(D) | #1(D) | #2(D) | #3(D) | #4(D) | GP | #5(U) | #6(U) | #7(U) | GP |

9-c A frame structure corresponding to a radio frame having one downlink second symbol and one first symbol and locations of the second symbol and the first symbol

| #0(D) | #1(D) | #2(D) | #3(D) | GP | #4(U) | #5(U) | #6(U) | #7(U) | GP |

9-d A frame structure corresponding to a radio frame having one uplink second symbol and one first symbol and locations of the second symbol and the first symbol

FIG. 9

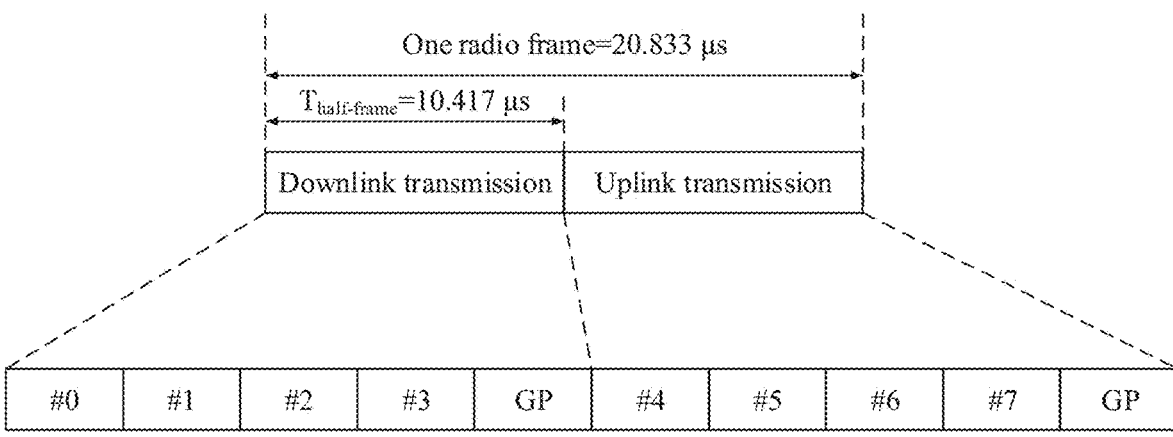

FIG. 10

INFORMATION TRANSMISSION METHOD AND APPARATUS

CROSS-REFERENCE TO RELATED APPLICATIONS

This application is a continuation of International Application No. PCT/CN2020/106457, filed on Jul. 31, 2020, which claims priority to International Application No. PCT/CN2020/099804, filed on Jul. 1, 2020. The disclosures of the aforementioned applications are hereby incorporated by reference in their entireties.

TECHNICAL FIELD

The present invention relates to the field of communication technologies, and especially, to short range communication. In particular, the present invention relates to an information transmission method and an apparatus.

BACKGROUND

As global communication technologies develop, a development speed and application of wireless communication technologies, with a development trend in full swing, have surpassed those of fixed communication technologies. Intelligent terminals such as an intelligent transportation device, a smart home device, and a robot gradually enter people's daily life.

The following uses the intelligent transportation device, one of the intelligent terminals, as an example. Development and application of an Internet of Vehicles technology attract more and more attention. Compared with the existing wired communication, in-vehicle wireless communication can further reduce a quantity, length, and weight of internal wiring harnesses of a vehicle, and corresponding installation and maintenance costs. Therefore, in-vehicle communication technologies gradually become wireless. Diversification of in-vehicle applications leads to an increasing quantity and more types of in-vehicle communication nodes, and imposes a higher requirement on an in-vehicle communication capability.

In many wireless communication scenarios, there is usually a plurality of communication domains in a specific communication area or range. FIG. 1 is a schematic diagram of a topological relationship of in-vehicle communication links. The communication domain is a system including a group of communication nodes having communication relationships and communication connection relationships (namely, communication links) between the communication nodes. One communication domain includes one primary communication node (which may be referred to as a primary node for short) and at least one secondary communication node (which may be referred to as a secondary node for short). The primary node manages a time-frequency resource of the communication domain, and has a function of scheduling the resource for a communication link between the primary and secondary nodes. A node that does not belong to the communication domain (which may be referred to as an external node for short, including a device that has never joined the communication domain and a device that has joined the communication domain and then exits the communication domain) may be converted into a secondary node of the communication domain through a process of joining the communication domain. In the process of joining the communication domain, the external node first needs to synchronize with the communication domain, and obtain system information such as resource configuration and supported features of the communication domain.

Because different types of vehicles and communication domains support different services and features, time-frequency resources configured by primary nodes for secondary nodes are different, and correspondingly, formats of system information sent by the primary nodes to the secondary nodes are also different. Therefore, how to transmit information and improve scalability of a communication system is a technical problem being solved by persons skilled in the art.

SUMMARY

Embodiments of the present invention disclose an information transmission method and apparatus, to improve scalability of a communication system.

A first aspect of embodiments of the present invention discloses a transmission method, including:

sending a first signal on a first time-frequency resource through a first antenna port, where the first signal is used for synchronization;

sending a first message on a second time-frequency resource, where the first message includes time domain resource information and/or cyclic prefix length information of the second time-frequency resource; and sending a second message on a third time-frequency resource.

The first message is a broadcast message and/or the second message is a system message.

For example, the first message may be a master information block (master information block, MIB) message, and the first message may be sent by using a physical broadcast channel (physical broadcast channel, PBCH). The time domain resource information of the second time-frequency resource may be a time domain resource sequence number such as a frame number, a slot number, or a superframe number corresponding to the second time-frequency resource, or may be a part of the sequence number, for example, some of bits used to indicate the sequence number. For another example, the second message may be a system information block (system information block, SIB) message or a system information block 1 (system information block 1, SIB1) message.

In the foregoing method, the first message includes the cyclic prefix length information, so that a cyclic length may be directly determined based on the cyclic length information, without blindly detecting a relationship between a primary synchronization signal and a secondary synchronization signal to determine the cyclic prefix length, thereby reducing implementation complexity.

In another optional solution, the second message includes system identifier information and/or information about a first resource, and the first resource is used to bear an access request.

For example, the system identifier information may be an identity of a communication domain, a cell identity, or the like. The first resource is used by a first device to receive the access request, and the access request is a signal or signaling sent by another device (an external node) to the first device (a primary node of the communication domain) to request to join the domain.

In the foregoing method, the second message includes the system identifier information and/or the information about the first resource, so that a system identifier can be directly determined based on the second message, the first resource can be determined based on the information about the first resource, and a resource location of the access request can be directly determined based on the first resource configured by the first device. In addition, in a manner of configuring the first resource of the access request in the system, insufficiency or excessive waste of the resource is avoided, and system scalability is improved.

In another optional solution, the first message includes at least one of the following: information about the third time-frequency resource, symbol quantity information of the third time-frequency resource, period information of the second message, size information of the second message, or modulation and coding scheme information of the second message.

In the foregoing method, the first message includes information related to the second message, and the information related to the second message, such as at least one of a resource location, a coding scheme, and a modulation scheme, can be directly determined based on the first message, to reduce or avoid blind detection on the second message and ensure system scalability. The system may be further applied to different channel conditions, service requirements, and device requirements, and has good scalability.

In another optional solution, the method further includes: sending scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In the foregoing method, the scheduling information is sent, where the scheduling information includes related information of the second message, and related information of the scheduling information may be obtained based on the first message, to reduce or avoid blind detection on the second message and ensure system scalability. In addition, a size, a modulation and coding scheme, a period, a resource, and the like of the second message that are included in the scheduling information may all change. Therefore, the system is applicable to different channel conditions, service requirements, and device requirements, and has good scalability.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In the foregoing method, the first message includes the related information of the scheduling information, and the related information of the scheduling information may be directly determined based on the first message, to reduce or avoid blind detection on the scheduling information.

In another optional solution, the method further includes: sending a third message on a fifth time-frequency resource, where the third message is used to indicate a second resource, and the second resource is used to transmit at least one of a first control-type signal or first control-type signaling.

In the foregoing method, the second resource is directly indicated in the third message, and the resource used to transmit the first control-type signal or signaling may be determined based on the third message. In a manner of configuring the resource in the system, insufficiency or excessive waste of the resource is avoided, and system scalability is improved. In addition, the third message is periodically sent, so that resource configuration information indicated by the third message can be quickly and flexibly changed, to adapt to changes of a channel condition and a service requirement.

In another optional solution, the first message includes information used to indicate a third resource, and/or the second message includes information used to indicate a fourth resource, and the third resource and/or the fourth resource are/is used to transmit at least one of the first control-type signal or signaling.

In the foregoing method, the first message includes the third resource, and the second message includes the fourth resource. After the first message and the second message are obtained, the resource for transmitting the first control-type signal or signaling may be directly determined. This is simple and convenient. In a manner of configuring the resource in the system, insufficiency or excessive waste of the resource is avoided, and system scalability is improved.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by the first device, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first device.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource. Correspondingly, another device may determine a symbol quantity of the second resource, the third resource, and/or the fourth resource in the first-type time unit based on the received symbol quantity information of the second resource, the third resource, and/or the fourth resource in the first-type time unit, and determine the second resource, the third resource, and/or the fourth resource based on a preset rule.

In another optional solution, the sending a first message on a second time-frequency resource includes: sending the first message on the second time-frequency resource through the first antenna port; and/or the sending a second message on a third time-frequency resource includes: sending the second message on the third time-frequency resource through the first antenna port; and/or the sending scheduling information on a fourth time-frequency resource includes: sending the scheduling information on the fourth time-frequency resource through the first antenna port; and/or the sending a third message on a fifth time-frequency resource includes: sending the third message on the fifth time-frequency resource through the first antenna port.

In the foregoing method, the antenna port used to send the first message, the second message, the scheduling information, and the third message is the same as the antenna port used to send the first signal, so that states of channels of the first message, the second message, the scheduling information, and the third message can be directly inferred based on a channel of the first signal, and a reference signal used for demodulation does not need to be sent, thereby reducing resources and a delay.

In another optional solution, the method further includes: sending a fourth message to a second device, where the fourth message is used to indicate a fifth resource, the fifth resource is used for a second control-type signal or second control-type signaling of the second device, and the second control-type signal or signaling includes one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second device, and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second device.

In the foregoing method, the first device sends the fourth message to the second device, and the fourth message is used to indicate the resource of the second control-type signal or signaling of the second device. The first device directly configures the resource of the second control-type signal or signaling for the second device. In a manner of configuring the resource in the system, insufficiency or excessive waste of the resource is avoided, and flexibility of configuring the resource in the system is improved.

In another optional solution, the method further includes: sending a fifth message on a sixth time-frequency resource, where the fifth message is used to indicate a resource used for service data of a first service type.

In the foregoing method, the first device sends the fifth message, and the fifth message is used to indicate the resource used for the service data of the first service type. The first device directly configures the resource for the service data of the first service type. In a manner of configuring the resource in the system, insufficiency or excessive waste of the resource is avoided, and system scalability is improved. In addition, the resource used for the service data of the first service type may be excluded from resources indicated by scheduling signaling, thereby simplifying scheduling signaling of service data other than the service data of the first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In the foregoing method, the first symbol is the $N^{th}$ symbol in the second-type time unit, and the time domain resource corresponding to at least one of the first time-frequency resource, the second time-frequency resource, the third time-frequency resource, the fourth time-frequency resource, the fifth time-frequency resource, or the sixth time-frequency resource includes one or more first symbols. Therefore, a location of each first symbol may be directly determined based on such a rule. Correspondingly, the second time-frequency resource is directly determined based on the first time-frequency resource, and blind detection is not required.

In another optional solution, N is equal to 1. In other words, the first symbol is the first symbol in the second-type time unit. The first symbol is a symbol used for downlink transmission, and the first symbol in the second-type time unit is a symbol always used for downlink transmission in various uplink/downlink resource configurations. Therefore, this solution can ensure that the first symbol may exist in the second-type time unit in various uplink/downlink resource configurations.

In another optional solution, a sixth message is sent, and the sixth message includes index information of a resource whose time domain range is in the second-type time unit. Further optionally, the index information is applied to at least one second-type time unit. The sixth message includes the index information of the resource in the second-type time unit instead of directly indicating an absolute location of the resource, so that second-type time units using different resource division methods can be flexibly adapted.

In another optional solution, the at least one second-type time unit includes at least one first second-type time unit, the first second-type time unit does not include the first symbol, and an index range of the index information in the first second-type time unit includes an $N^{th}$ symbol of the first second-type time unit.

In another optional solution, the at least one second-type time unit includes at least one second second-type time unit, the second second-type time unit includes the first symbol, and an index range of the index information in the second-type time unit does not include an $N^{th}$ symbol of the second second-type time unit.

Further optionally, the index range of the index information in the first second-type time unit does not include a symbol that is adjacent to a first guard period and before or after the first guard period in the first second-type time unit. Alternatively, the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit, where W is a positive integer greater than or equal to 2.

According to the foregoing method, quantities of resources in the index ranges of the index information in the first second-type time unit and the second second-type time unit can be the same, thereby simplifying a design of the index information.

In the foregoing method, one piece of index information may be used to uniformly indicate resources in a plurality of second-type time units in different resource division methods, thereby reducing index information overheads. In addition, in the foregoing manner, a resource available for service data transmission can be used more fully.

In another optional solution, N is equal to 1.

In another optional solution, first configuration information is sent, and the first configuration information is used to indicate information about the second-type time unit including the first symbol. In this manner, correspondingly, after the first configuration information is obtained, the second-type time unit including the first symbol and the second-type time unit not including the first symbol may be quickly determined based on the first configuration information.

In another optional solution, the first configuration information is used to indicate information about a quantity of second-type time units including the first symbol or information about a quantity of second-type time units including the first symbol in the first-type time unit. In this manner, correspondingly, after the first configuration information is obtained, the information about the quantity of second-type time units including the first symbol and information about a quantity of second-type time units not including the first symbol may be quickly determined based on the first configuration information.

In another optional solution, second configuration information is sent, and the second configuration information indicates whether a resource used to transmit the service data of the first service type is included or whether a resource used to transmit the service data of the first service type is included on a first frequency resource.

In another optional solution, if the second configuration information indicates that the resource used to transmit the service data of the first service type is not included or the resource used to transmit the service data of the first service type is not included on the first frequency resource, the fifth message is not sent on the sixth time-frequency resource.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit. Downlink transmission means that the first device (which may be a primary node in a communication domain) sends service data to another device (which may be a secondary node in the communication domain), and uplink transmission means that the another device sends service data to the first device, or an external node sends service data to the primary node.

In the foregoing method, a location of the second symbol can be quickly determined by using the foregoing rule, so as to determine the resource used to transmit the first control-type signal or signaling.

In another optional solution, the first message, the second message, and/or the third message include/includes first information. The first information may be used to indicate the location of the second symbol and/or a structure of the second-type time unit. Optionally, the first information includes rule indication information, and the rule indication information is used to indicate at least one of a plurality of rules. The plurality of rules include a first rule or a second rule. It should be noted herein that the structure of the second-type time unit includes composition of the second-type time unit, for example, types of a plurality of symbols included in the second-type time unit, and may specifically include: which symbols in the plurality of symbols are uplink symbols, which symbols are downlink symbols, which symbols are special symbols, and/or the like. Optionally, when the second-type time unit is a radio frame, a structure of the second-type time unit is a frame structure.

In another optional solution, the first message, the second message, and/or the third message include/includes uplink/downlink resource configuration information. The uplink/downlink resource configuration information may indicate a resource used to transmit uplink control information or an uplink control signal and/or a resource that can be used for downlink control information or a downlink control signal, or may indicate a resource used to transmit uplink service data and/or a resource used to transmit downlink service data (that is, does not include control information or a control signal). The resource configuration information may indicate a specific resource location or a resource quantity or proportion.

In an implementation, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol. For example, if the second-type time unit includes eight symbols, and the basic uplink-downlink configuration ratio is 1:1, both the quantity of downlink symbols and the quantity of uplink symbols that are indicated by the basic uplink-downlink configuration ratio are 4.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, the location of the second symbol is determined by using a preset rule. In this manner, a specific rule type may not need to be indicated.

In another optional solution, the preset rule is the first rule or the second rule.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

All the valid frequency domain resources in the 20 megahertz bandwidth are frequency domain resources in the 20 megahertz bandwidth other than a bandwidth used as a guard period, or frequency domain resources in the 20 megahertz bandwidth other than a bandwidth used as a guard period and a direct current component subcarrier. Specifically, for example, a 20 MHz channel calculated based on a 480 kHz subcarrier spacing may include 41.67 subcarriers in total. However, in practice, parts of bandwidth on two sides of the 20 MHz bandwidth are used as guard periods, and there are remaining, for example, 40 subcarriers other than the guard periods. The 40 subcarriers include one or more subcarriers used to suppress a direct current component, and these subcarriers are referred to as direct current component subcarriers for short. In this case, the frequency domain resource may be the 40 subcarriers in the 20 megahertz bandwidth or a subcarrier other than the one or more direct current component subcarriers in the 40 subcarriers in the 20 megahertz bandwidth. By using as many subcarriers as possible to transmit signals or signaling, a maximum frequency diversity gain can be obtained.

In another optional solution, the first message is a broadcast message and/or the second message is a system message.

For example, the broadcast message is an MIB message, and the system message may be a system information block 1 (system information block 1, SIB1) message.

A second aspect of embodiments of the present invention discloses a transmission method, including:

receiving a first signal on a first time-frequency resource through a first antenna port, where the first signal is used for synchronization;

receiving a first message on a second time-frequency resource, where the first message includes time domain resource information and/or cyclic prefix length information of the second time-frequency resource; and receiving a second message on a third time-frequency resource.

In the foregoing method, the first message includes the cyclic prefix length information, so that a cyclic length may be directly determined based on the cyclic length information, without blindly detecting a relationship between a primary synchronization signal and a secondary synchronization signal to determine the cyclic prefix length, thereby reducing implementation complexity.

In an optional solution, the second message includes system identifier information and/or information about a first resource, and the first resource is used to bear an access request.

In the foregoing method, the second message includes the system identifier information and/or the information about the first resource, so that a system identifier can be directly determined based on the second message, the first resource can be determined based on the information about the first resource, and a resource location of the access request can be directly determined based on the first resource configured by a first device. In addition, in a manner of configuring the first resource of the access request in the system, insufficiency or excessive waste of the resource is avoided, and system scalability is improved.

In another optional solution, the first message includes at least one of the following: information about the third time-frequency resource, symbol quantity information of the third time-frequency resource, period information of the second message, size information of the second message, or modulation and coding scheme information of the second message.

In the foregoing method, the first message includes information related to the second message, and the information related to the second message, such as a resource location, a coding scheme, and a modulation scheme, can be directly determined based on the first message, to reduce or avoid blind detection on the second message and ensure system scalability. In addition, a size, a modulation and coding scheme, a period, a resource, and the like of the second message that are included in the first message may all change. Therefore, the system is applicable to different channel conditions, service requirements, and device requirements, and has good scalability.

In another optional solution, the method further includes: receiving scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In the foregoing method, the scheduling information is sent, where the scheduling information includes related information of the second message, and related information of the scheduling information may be obtained based on the first message, to reduce or avoid blind detection on the second message and ensure system scalability. In addition, a size, a modulation and coding scheme, a period, a resource, and the like of the second message that are included in the scheduling information may all change. Therefore, the system is applicable to different channel conditions, service requirements, and device requirements, and has good scalability.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In the foregoing method, the first message includes the related information of the scheduling information, and the related information of the scheduling information may be directly determined based on the first message, to reduce or avoid blind detection on the scheduling information.

In another optional solution, the method further includes: receiving a third message on a fifth time-frequency resource, where the third message is used to indicate a second resource, and the second resource is used to transmit at least one of a first control-type signal or first control-type signaling.

In the foregoing method, the second resource is directly indicated in the third message, and the resource used to transmit the first control-type signal or signaling may be determined based on the third message. In a manner of configuring the resource in the system, insufficiency or excessive waste of the resource is avoided, and system scalability is improved.

In another optional solution, the first message includes information used to indicate a third resource, and/or the second message includes information used to indicate a fourth resource, and the third resource and/or the fourth resource are/is used to transmit at least one of the first control-type signal or signaling.

In the foregoing method, the first message includes the third resource, and the second message includes the fourth resource. After the first message and the second message are obtained, the resource for transmitting the first control-type signal or signaling may be directly determined. This is simple and convenient. In a manner of configuring the resource in the system, insufficiency or excessive waste of the resource is avoided, and system scalability is improved. In addition, the third message is periodically sent, so that resource configuration information indicated by the third message can be quickly and flexibly changed, to adapt to changes of a channel condition and a service requirement.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from the first device, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first device.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource. Correspondingly, the second resource, the third resource, and/or the fourth resource may be determined based on a received quantity of second resources, third resources, and/or fourth resources in the first-type time unit and a preset rule.

In another optional solution, the method further includes: determining a quantity of symbols in each second-type time unit based on a symbol quantity M of the second resource and a predefined rule, where the first-type time unit includes K second-type time units, and both M and K are positive integers.

In another optional solution, the predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

In another optional solution, the receiving a first message on a second time-frequency resource includes: receiving the first message on the second time-frequency resource through the first antenna port; and/or the receiving a second message on a third time-frequency resource includes: receiving the second message on the third time-frequency resource through the first antenna port; and/or the receiving scheduling information on a fourth time-frequency resource includes: receiving the scheduling information on the fourth time-frequency resource through the first antenna port; and/or the receiving a third message on a fifth time-frequency resource includes: receiving the third message on the fifth time-frequency resource through the first antenna port.

In the foregoing method, the antenna port used to send the first message, the second message, the scheduling information, and the third message is the same as the antenna port used to send the first signal, so that states of channels of the first message, the second message, the scheduling information, and the third message can be directly inferred based on a channel of the first signal, and a reference signal used for demodulation does not need to be sent, thereby reducing resources and a delay.

In another optional solution, the method further includes: receiving a fourth message from the first device, where the fourth message is used to indicate a fifth resource, the fifth resource is used for a second control-type signal or second control-type signaling of a second device, and the second control-type signal or signaling includes one or more of the synchronization signal, the acknowledgment/negative acknowledgment feedback information, the broadcast message, the system message, the physical layer control signaling, the higher layer signaling, the demodulation reference signal, the phase tracking reference signal, the positioning reference signal, and the channel state information reference signal from the first device, and/or one or more of the access request signaling or signal, the scheduling request signaling or signal, the acknowledgment/negative acknowledgment feedback information, the channel feedback information, the physical layer control signaling, the higher layer signaling, the demodulation reference signal, the phase tracking reference signal, the positioning reference signal, and the channel sounding reference signal sent to the first device.

In the foregoing method, the first device sends the fourth message to the second device, and the fourth message is used to indicate the resource of the second control-type signal or signaling of the second device. The first device directly configures the resource of the second control-type signal or signaling for the second device. In a manner of configuring the resource in the system, insufficiency or excessive waste of the resource is avoided, and flexibility of configuring the resource in the system is improved.

In another optional solution, the method further includes: receiving a fifth message on a sixth time-frequency resource, where the fifth message is used to indicate a resource used for service data of a first service type.

In the foregoing method, the first device sends the fifth message to the second device, and the fifth message is used to indicate the resource used for the service data of the first service type. The first device directly configures the resource for the service data of the first service type. In a manner of configuring the resource in the system, insufficiency or excessive waste of the resource is avoided, and system scalability is improved. In addition, the resource used for the service data of the first service type may be excluded from resources indicated by scheduling signaling, thereby simplifying scheduling signaling of service data other than the service data of the first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In the foregoing method, the first symbol is the $N^{th}$ symbol in the second-type time unit, and the time domain resource corresponding to at least one of the first time-frequency resource, the second time-frequency resource, the third time-frequency resource, the fourth time-frequency resource, the fifth time-frequency resource, or the sixth time-frequency resource includes one or more first symbols. Therefore, a location of each first symbol may be directly determined based on such a rule. Correspondingly, the second time-frequency resource is directly determined based on the first time-frequency resource, and blind detection is not required.

In another optional solution, a sixth message is received, and the sixth message includes index information of a resource whose time domain range is in the second-type time unit. Further optionally, the index information is applied to at least one second-type time unit. The sixth message includes the index information of the resource in the second-type time unit instead of directly indicating an absolute location of the resource, so that second-type time units using different resource division methods can be flexibly adapted.

In another optional solution, the at least one second-type time unit includes at least one first second-type time unit, the first second-type time unit does not include the first symbol, and an index range of the index information in the first second-type time unit includes an $N^{th}$ symbol of the first second-type time unit.

In another optional solution, the at least one second-type time unit includes at least one second second-type time unit, the second second-type time unit includes the first symbol, and an index range of the index information in the second-type time unit does not include an $N^{th}$ symbol of the second second-type time unit.

Further optionally, the index range of the index information in the first second-type time unit does not include a symbol that is adjacent to a first guard period and before or after the first guard period in the first second-type time unit; or the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit, where W is a positive integer greater than or equal to 2.

In the foregoing method, one piece of index information may be used to uniformly indicate resources in a plurality of second-type time units in different resource division methods, thereby reducing index information overheads. In addition, in the foregoing manner, a resource available for service data transmission can be used more fully.

In another optional solution, N is equal to 1.

In another optional solution, first configuration information is received, and the first configuration information is used to indicate information about the second-type time unit including the first symbol. In this manner, the second-type time unit including the first symbol and the second-type time unit not including the first symbol may be quickly determined based on the first configuration information.

In another optional solution, the first configuration information is used to indicate information about a quantity of second-type time units including the first symbol or information about a quantity of second-type time units including the first symbol in the first-type time unit. In this manner, the information about the quantity of second-type time units including the first symbol and information about a quantity of second-type time units not including the first symbol may be quickly determined based on the first configuration information.

In another optional solution, second configuration information is received, and the second configuration information indicates whether a resource used to transmit the service data of the first service type is included or whether a resource used to transmit the service data of the first service type is included on a first frequency resource.

In another optional solution, if the second configuration information indicates that the resource used to transmit the service data of the first service type is not included or the resource used to transmit the service data of the first service type is not included on the first frequency resource, the fifth message is not received on the sixth time-frequency resource.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In the foregoing method, a location of the second symbol can be quickly determined by using the foregoing rule, so as to determine the resource used to transmit the first control-type signal or signaling.

In another optional solution, the first message, the second message, and/or the third message include/includes first information, and the first information is used to indicate the location of the second symbol and/or a structure of the second-type time unit.

In another optional solution, the first message, the second message, and/or the third message include/includes uplink/downlink resource configuration information.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

A third aspect of embodiments of the present invention discloses a transmission apparatus, including:

a processing unit, configured to send a first signal on a first time-frequency resource through a communication unit and a first antenna port, where the first signal is used for synchronization.

The communication unit is further configured to send a first message on a second time-frequency resource, where the first message includes time domain resource information and/or cyclic prefix length information of the second time-frequency resource.

The communication unit is further configured to send a second message on a third time-frequency resource.

In another optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the communication unit is further configured to send scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the communication unit is further configured to send a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by a first apparatus, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the communication unit is further configured to: send the first message on the second time-frequency resource through the first antenna port; and/or send the second message on the third time-frequency resource through the first antenna port; and/or send the scheduling information on the fourth time-frequency resource through the first antenna port; and/or send the third message on the fifth time-frequency resource through the first antenna port.

In another optional solution, the communication unit is further configured to send a fourth message to a second apparatus, where the fourth message is used to indicate a fifth resource, the fifth resource is used for a second control-type signal or second control-type signaling of the second apparatus, and the second control-type signal or signaling includes one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second apparatus, and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second apparatus.

In another optional solution, the communication unit is further configured to send a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information, and the first information is used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In an implementation, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, the location of the second symbol is determined by using a preset rule. In this manner, a specific rule type may not need to be indicated.

In another optional solution, the preset rule is the first rule or the second rule.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

For technical effects brought by the third aspect or the optional solutions, refer to the descriptions of the technical effects brought by the first aspect or the corresponding implementations.

A fourth aspect of embodiments of the present invention discloses a transmission apparatus, including:

a processing unit, configured to receive a first signal on a first time-frequency resource through a communication unit and a first antenna port, where the first signal is used for synchronization.

The communication unit is configured to receive a first message on a second time-frequency resource, where the first message includes time domain resource information and/or cyclic prefix length information of the second time-frequency resource.

The communication unit is further configured to receive a second message on a third time-frequency resource.

In an optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the communication unit is further configured to receive scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the communication unit is further configured to receive a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from a first apparatus, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the communication unit is further configured to determine a quantity of symbols in each second-type time unit based on a symbol quantity M of the second resource and a predefined rule, where the first-type time unit includes K second-type time units, and both M and K are positive integers.

In another optional solution, the predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

In another optional solution, the communication unit is further configured to: receive the first message on the second time-frequency resource through the first antenna port; and/or receive the second message on the third time-frequency resource through the first antenna port; and/or receive the scheduling information on the fourth time-frequency resource through the first antenna port; and/or receive the third message on the fifth time-frequency resource through the first antenna port.

In another optional solution, the communication unit is further configured to receive a fourth message from the first apparatus, where the fourth message is used to indicate a fifth resource, the fifth resource is used for a second control-type signal or second control-type signaling of a second apparatus, and the second control-type signal or signaling includes one or more of the synchronization signal, the acknowledgment/negative acknowledgment feedback information, the broadcast message, the system message, the physical layer control signaling, the higher layer signaling, the demodulation reference signal, the phase tracking reference signal, the positioning reference signal, and the channel state information reference signal from the first apparatus, and/or one or more of the access request signaling or signal, the scheduling request signaling or signal, the acknowledgment/negative acknowledgment feedback information, the channel feedback information, the physical layer control signaling, the higher layer signaling, the demodulation reference signal, the phase tracking reference signal, the positioning reference signal, and the channel sounding reference signal sent to the first apparatus.

In another optional solution, the communication unit is further configured to receive a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate the location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

For technical effects brought by the fourth aspect or the optional solutions, refer to the descriptions of the technical effects brought by the second aspect or the corresponding implementations.

A fifth aspect of embodiments of the present invention discloses an information transmission apparatus, including at least one processor and a transceiver. The at least one processor is configured to communicate with another apparatus through the transceiver, the memory is configured to store a computer program, and the processor is configured to invoke the computer program to perform the following operations:

sending a first signal on a first time-frequency resource through a first antenna port, where the first signal is used for synchronization;

sending a first message on a second time-frequency resource, where the first message includes time domain resource information and/or cyclic prefix length information of the second time-frequency resource; and sending a second message on a third time-frequency resource.

In another optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the processor is further configured to send scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the processor is further configured to send a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by a first apparatus, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the processor is further configured to: send the first message on the second time-frequency resource through the first antenna port; and/or send the second message on the third time-frequency resource through the first antenna port; and/or send the scheduling information on the fourth time-frequency resource through the first antenna port; and/or send the third message on the fifth time-frequency resource through the first antenna port.

In another optional solution, the processor is further configured to send a fourth message to a second apparatus, where the fourth message is used to indicate a fifth resource, the fifth resource is used for a second control-type signal or second control-type signaling of the second apparatus, and the second control-type signal or signaling includes one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second apparatus, and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second apparatus.

In another optional solution, the processor is further configured to send a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In an implementation, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

For technical effects brought by the fifth aspect or the optional solutions, refer to the descriptions of the technical effects brought by the first aspect or the corresponding implementations.

A sixth aspect of embodiments of the present invention discloses an information transmission apparatus, including at least one processor and a transceiver. The at least one processor is configured to communicate with another apparatus through the transceiver, the memory is configured to store a computer program, and the processor is configured to invoke the computer program to perform the following operations:

receiving a first signal on a first time-frequency resource through a first antenna port, where the first signal is used for synchronization;

receiving a first message on a second time-frequency resource, where the first message includes time domain resource information and/or cyclic prefix length information of the second time-frequency resource; and receiving a second message on a third time-frequency resource.

In an optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the processor is further configured to receive scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the processor is further configured to receive a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from a first apparatus, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the processor is further configured to determine a quantity of symbols in each second-type time unit based on a symbol quantity M of the second resource and a predefined rule, where the first-type time unit includes K second-type time units, and both M and K are positive integers.

In another optional solution, the predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

In another optional solution, the processor is further configured to: receive the first message on the second time-frequency resource through the first antenna port; and/or receive the second message on the third time-frequency resource through the first antenna port; and/or receive the scheduling information on the fourth time-frequency resource through the first antenna port; and/or receive the third message on the fifth time-frequency resource through the first antenna port.

In another optional solution, the processor is further configured to receive a fourth message from the first apparatus, where the fourth message is used to indicate a fifth resource, the fifth resource is used for a second control-type signal or second control-type signaling of a second apparatus, and the second control-type signal or signaling includes one or more of the synchronization signal, the acknowledgment/negative acknowledgment feedback information, the broadcast message, the system message, the physical layer control signaling, the higher layer signaling, the demodulation reference signal, the phase tracking reference signal, the positioning reference signal, and the channel state information reference signal from the first apparatus, and/or one or more of the access request signaling or signal, the scheduling request signaling or signal, the acknowledgment/negative acknowledgment feedback information, the channel feedback information, the physical layer control signaling, the higher layer signaling, the demodulation reference signal, the phase tracking reference signal, the positioning reference signal, and the channel sounding reference signal sent to the first apparatus.

In another optional solution, the processor is further configured to receive a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, the processor is further configured to receive a sixth message, and the sixth message includes index information of a resource whose time domain range is in the second-type time unit. Further optionally, the index information is applied to at least one second-type time unit.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

For technical effects brought by the sixth aspect or the optional solutions, refer to the descriptions of the technical effects brought by the second aspect or the corresponding implementations.

A seventh aspect of embodiments of this application discloses a chip. The chip includes at least one processor and an interface circuit. Optionally, the chip further includes a memory. The memory, the interface circuit, and the at least one processor are interconnected through a line. The at least one memory stores a computer program. When the computer program is executed by the processor, the method described in any aspect or the optional solution in any aspect is implemented.

An eighth aspect of embodiments of this application discloses a computer-readable storage medium. The computer storage medium stores a computer program, and when the computer program is executed by a processor, the method described in any aspect or the optional solution in any aspect is implemented.

A ninth aspect of embodiments of this application discloses an information transmission system. The system includes the apparatus according to the third aspect and the apparatus according to the fourth aspect.

A tenth aspect of embodiments of this application discloses a computer product. When the computer program product runs on a processor, the method described in any aspect or the optional solution in any aspect is implemented.

An eleventh aspect of embodiments of this application discloses a cockpit system, including at least one of the information transmission apparatus in the third aspect or the information transmission apparatus in the fourth aspect, or including at least one of the information transmission apparatus in the fifth aspect or the information transmission apparatus in the sixth aspect.

A twelfth aspect of embodiments of this application discloses an intelligent terminal. The intelligent terminal may include the cockpit system in the eleventh aspect. Specifically, the intelligent terminal may be a smart home device, an intelligent wearable device, an uncrewed aerial vehicle, an unmanned transport vehicle, an automobile, a robot, or the like.

BRIEF DESCRIPTION OF DRAWINGS

FIG. 6 is a manner of determining a frame structure and a location of a second symbol based on a first rule according to an embodiment of the present invention;

FIG. 7 is a manner of determining a frame structure and a location of a second symbol based on a first rule according to an embodiment of the present invention;

FIG. 8 is a manner of determining a frame structure and a location of a second symbol based on a second rule according to an embodiment of the present invention;

FIG. 9 is a manner of determining a frame structure and a location of a second symbol based on a second rule according to an embodiment of the present invention;

FIG. 10 is a schematic diagram of symbols in a radio frame;

DESCRIPTION OF EMBODIMENTS

Figure 1:
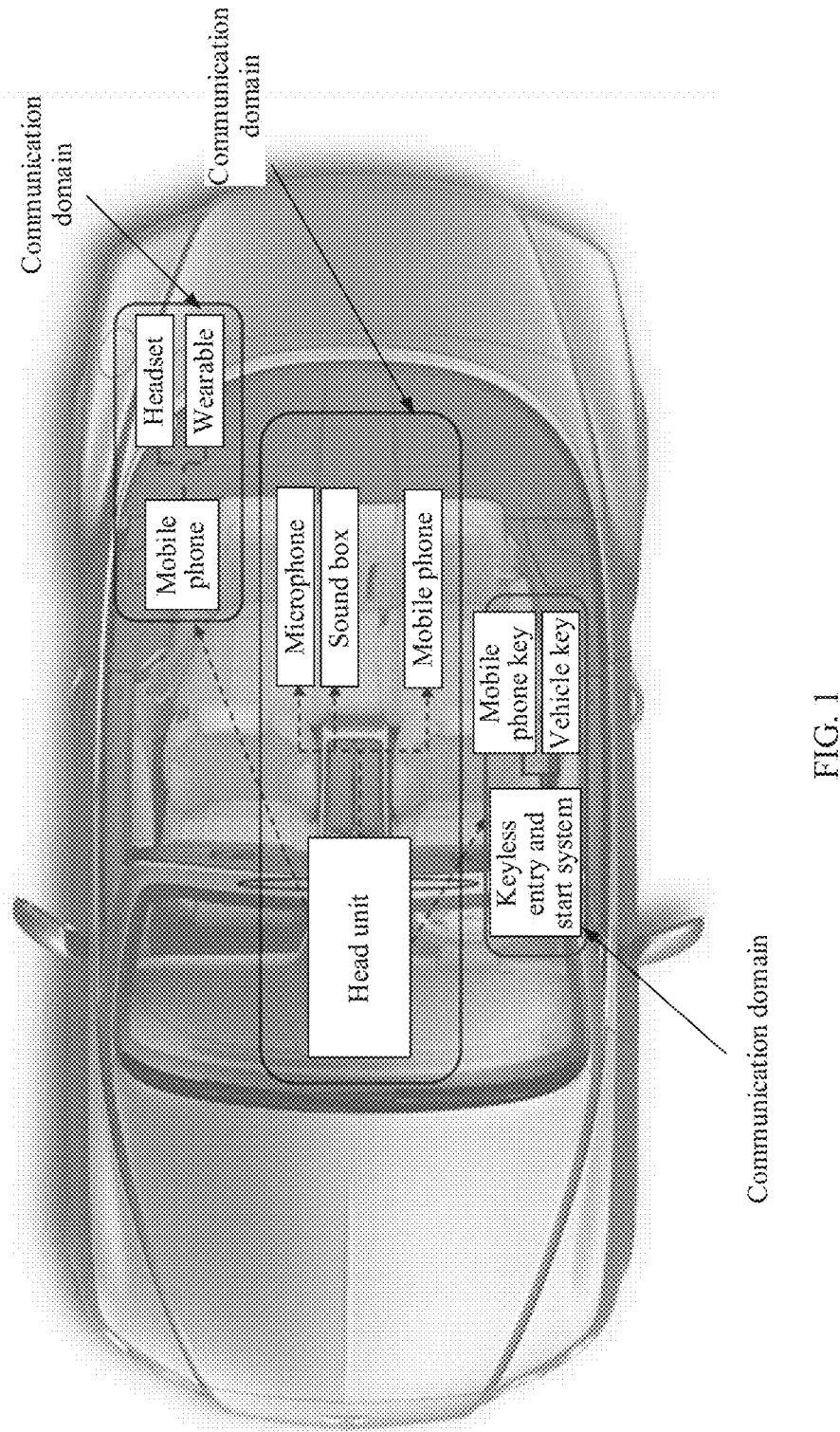
FIG. 1 is a schematic diagram of a topological relationship of in-vehicle communication links according to an embodiment of the present invention.

The following describes embodiments of the present invention with reference to the accompanying drawings in embodiments of the present invention.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

An apparatus in embodiments of this application may be a vehicle-mounted device such as a head unit, a vehicle-mounted speaker, or a vehicle-mounted microphone, or may be an electronic device such as a mobile phone, a tablet computer, a desktop computer, a laptop, a notebook computer, an ultra-mobile personal computer (ultra-mobile personal computer, UMPC), a handheld computer, a netbook, a personal digital assistant (personal digital assistant, PDA), a wearable electronic device, or a virtual reality device.

Some terms in this application are first described, so as to help persons skilled in the art have a better understanding.

(1) CDC: cockpit domain controller or control domain cockpit. The cockpit domain controller is referred to as head unit for short. In addition to conventional radio, music and video playing, and navigation functions, the head unit has a cellular communication function (3G, 4G, and the like) and telematics currently. The head unit can work with an automobile CAN-BUS technology to implement information communication between a person and a vehicle and between a vehicle and the outside world, so that user experience and functions related to a service and security are enhanced.

(2) Primary node and secondary node: Two types of nodes that are distinguished in terms of logical function are respectively the primary node and the secondary node. The primary node manages the secondary node, has a resource allocation function, and is responsible for allocating resources to the secondary node. The secondary node communicates, based on scheduling of the primary node, with the primary node by using the resources allocated by the primary node. The nodes may be various apparatuses. For example, the primary node is a mobile phone, the secondary node is a headset. The mobile phone establishes a communication connection to the headset to implement data exchange. The mobile phone manages the headset. The mobile phone has a resource allocation function, and may allocate resources to the headset.

(3) Communication domain: The communication domain is a system that includes a group of communication nodes that have a communication relationship, and includes a communication connection relationship between the communication nodes. One apparatus or device may be in a plurality of communication domains. For example, when a mobile phone performs wireless communication with a headset, the mobile phone is in a communication domain a including the mobile phone and the headset. In the communication domain a, the mobile phone is a primary node, and the headset is a secondary node. Then, after the mobile phone detects a CDC and establishes a wireless connection to the CDC, the mobile phone is also in a communication domain b including the mobile phone and the CDC. In the communication domain b, the CDC is a primary node, the mobile phone is a secondary node, and the mobile phone follows scheduling of the CDC. The communication domain b may further include other secondary nodes such as a vehicle-mounted sound box and a microphone.

(4) External node: A node that does not belong to a communication domain is an external node of the communication domain. The external node includes a device that has never joined the communication domain and a device that has joined the communication domain and then exits the communication domain. The external node may be converted into a secondary node of the communication domain in a process of joining the communication domain.

(5) Uplink transmission is that a secondary node or an external node sends a data signal or signaling to a primary node, and downlink transmission is that the primary node sends a data signal or signaling to the secondary node or the external node. Resource configuration information of uplink transmission and downlink transmission is referred to as uplink/downlink resource configuration information for short, and sometimes transmission without distinguishing uplink or downlink is referred to as uplink/downlink transmission. It should be noted herein that "uplink transmission" and "downlink transmission" are merely intended to distinguish transmission directions, and a specific solution is not limited to literal expressions of "uplink" or "downlink".

Figure 2:
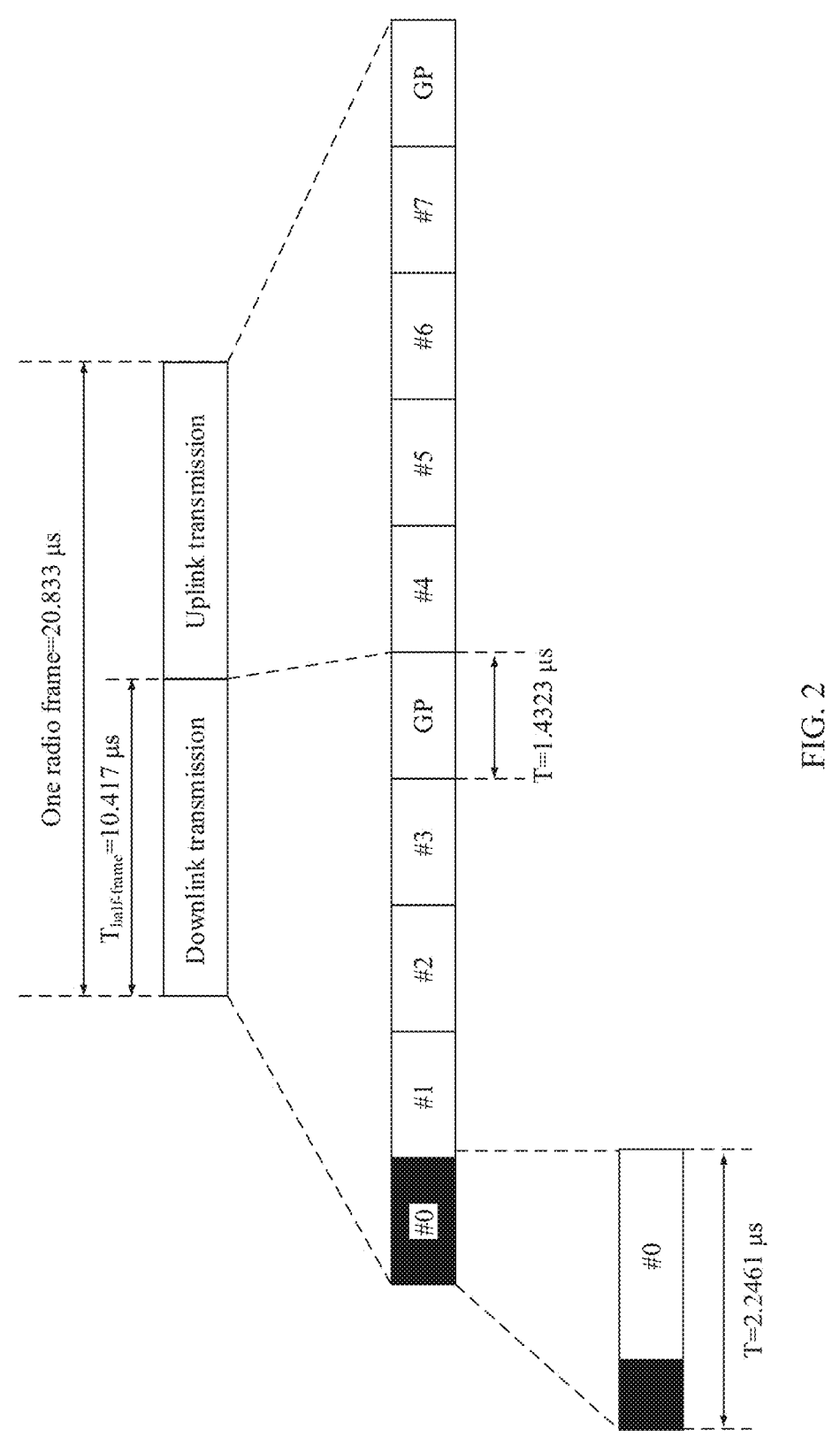
FIG. 2 is a schematic diagram of an example of a radio frame structure according to an embodiment of the present invention.

(6) An example of a radio frame structure: FIG. 2 is a schematic diagram of an example of a radio frame structure. A radio frame includes a downlink transmission part and an uplink transmission part. A radio frame includes a plurality of symbols and guard periods (guard period, GP). One radio frame is equal to 20.833 microseconds (μs). For example, a downlink transmission part of the radio frame is equal to 10.417 μs, and the downlink transmission part of the radio frame includes four symbols and a guard period. The four symbols are respectively a symbol #0, a symbol #1, a symbol #2, and a symbol #3. The symbol #0 (a black padding part) includes an orthogonal frequency division multiplexing (orthogonal frequency division multiplexing, OFDM) symbol including a cyclic prefix (cyclic prefix, CP). One symbol is equal to 8.9842 μs, and one guard period is equal to 1.4323 μs. An uplink transmission part of the radio frame is equal to 10.417 μs, and the uplink transmission part of the radio frame includes four symbols and a guard period. The four symbols are respectively a symbol #4, a symbol #5, a symbol #6, and a symbol #7. One symbol is equal to 8.9842 μs, and one guard period is equal to 1.4323 μs.

A wireless communication scenario to which the information transmission method provided in embodiments of this application is applied may include wide area wireless communication, for example, communication between a plurality of base stations and a plurality of user equipments (user equipment, UE). Alternatively, the wireless communication scenario may include an in-vehicle wireless communication scenario, for example, communication between a CDC and each of a vehicle-mounted sound box, a vehicle-mounted microphone, and a mobile phone, and communication between the mobile phone and a wearable device such as a headset. Alternatively, the wireless communication scenario may include wireless local area communication, for example, communication between a plurality of access points (access point, AP) and a plurality of stations (station).

Currently, a manner of sending system information is periodically sending a master information block (master information block, MIB) message, where the MIB message includes a part of system configuration information, and another part of system configuration information is sent by using a plurality of system information block (system information block, SIB) messages with different numbers. Each SIB message is scheduled and sent by using downlink control information (downlink control information, DCI). Correspondingly, if the SIB message is obtained, the DCI used to schedule the SIB message needs to be blindly detected, and implementation logic is relatively complex. In addition, when the DCI used to schedule the SIB message or the SIB message is obtained, a channel parameter needs to be obtained by using a reference signal, and then the DCI used to schedule the SIB message or the SIB message is balanced based on the channel parameter. Because a period of the reference signal is generally relatively long, and mobility of vehicle-mounted short-range wireless communication and an environment is relatively low, the reference signal is relatively sparse, resulting in a relatively large delay. To resolve the foregoing problems and improve system scalability, this application provides the following solutions.

To facilitate understanding of the information transmission method in embodiments of this application, the following specifically uses an in-vehicle wireless communication scenario as an example for description. However, the information transmission method in embodiments of this application is not limited to an in-vehicle communication scenario.

Figure 3:
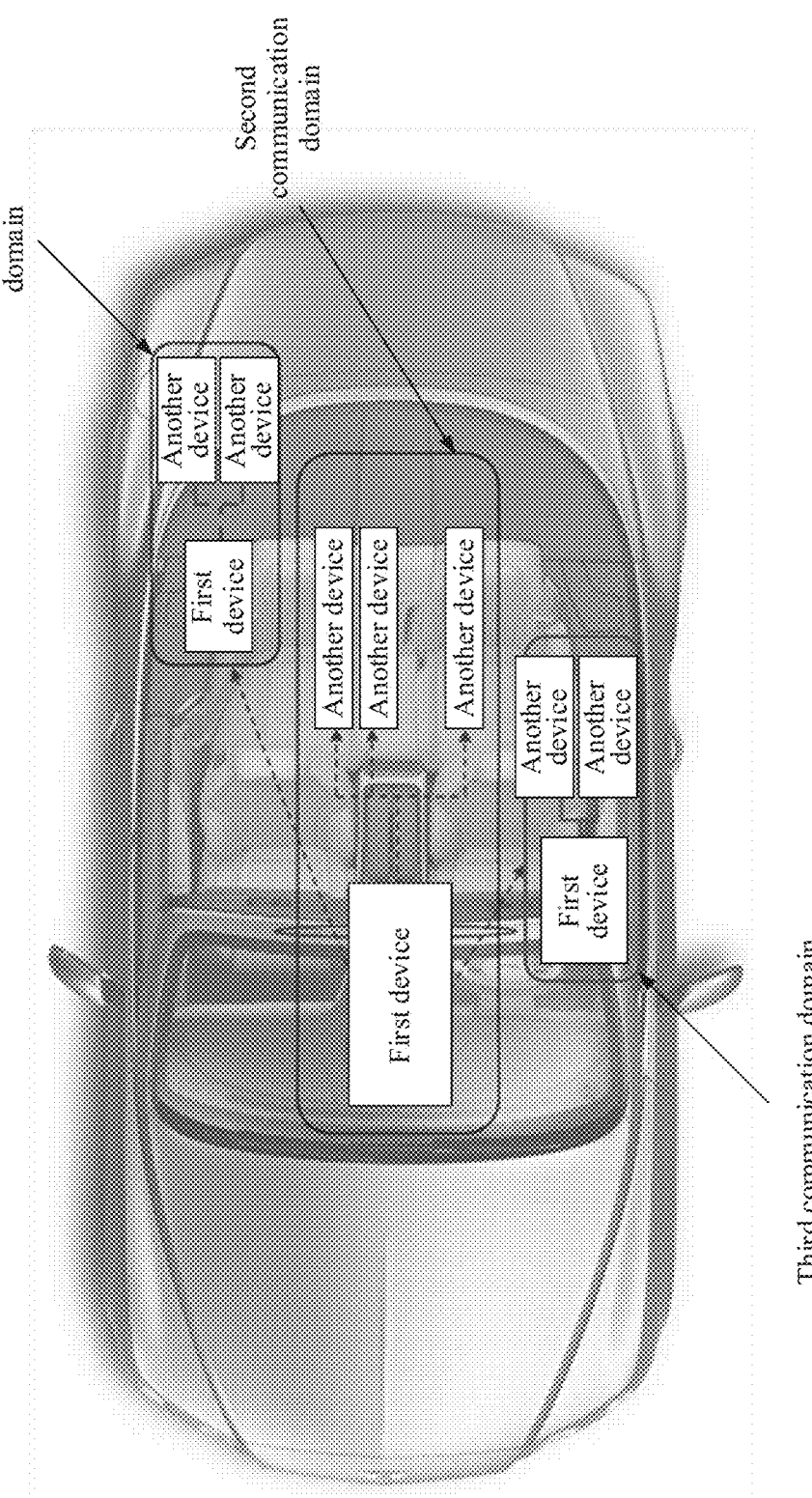
FIG. 3 is a schematic diagram of a scenario architecture of an information transmission method according to an embodiment of the present invention.

FIG. 3 is a schematic diagram of a scenario architecture of an information transmission method according to an embodiment of this application. The scenario architecture may include but is not limited to a first device and another device. The first device is a primary node in a communication domain, and the another device is a secondary node or an external node in the communication domain. For example, when a mobile phone performs wireless communication with a headset, the mobile phone is in a first communication domain including the mobile phone and the headset. In the first communication domain, the mobile phone is a primary node, and the headset is a secondary node. Then, after the mobile phone detects a CDC and establishes a wireless connection to the CDC, the mobile phone is also in a second communication domain including the mobile phone and the CDC. In the second communication domain, the CDC is a primary node, the mobile phone is a secondary node, and the mobile phone follows scheduling of the CDC. The second communication domain may further include other secondary nodes such as a vehicle-mounted sound box and a microphone.

Figure 4:
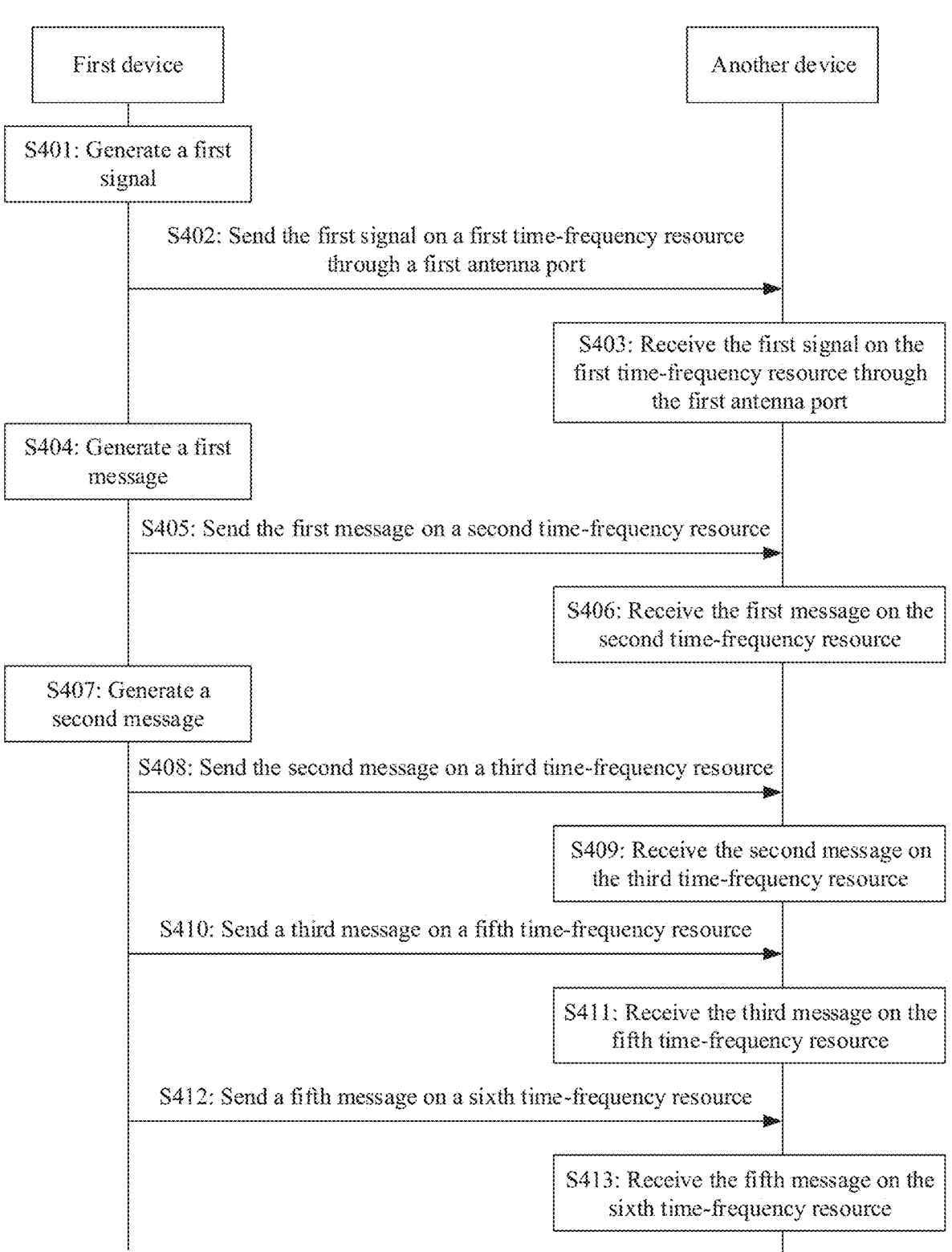
FIG. 4 is an information transmission method according to an embodiment of the present invention.

Refer to FIG. 4. FIG. 4 is an information transmission method according to an embodiment of the present invention. The method includes but is not limited to the following steps. In the following series of steps, except that a same message is generated before being sent and received after being sent, there is no limitation on a sequence of other steps.

Step S401: A first device generates a first signal.

Specifically, this step is an optional step. The first signal is used for synchronization, and the first signal may be used for time and/or frequency synchronization. The first signal may be at least one of a synchronization signal block (synchronization signal block, SSB), a primary synchronization signal (primary synchronization signal, PSS), and/or a secondary synchronization signal (secondary synchronization signal, SSS). For example, the first device may generate the first signal based on one or more of a type of a communication domain, a feature of the communication domain, and an identity of the communication domain. This is not limited in this embodiment of this application.

Step S402: The first device sends the first signal to another device on a first time-frequency resource through a first antenna port.

Specifically, the device receiving the first signal may determine, based on the first signal, a channel parameter corresponding to the antenna port. The channel parameter is used by the device receiving the first signal to perform channel demodulation on data transmitted through the antenna port. The first signal may have a periodic feature, and a period of the first signal is specified in a protocol. Alternatively, the first signal may be sent aperiodically through triggering.

In an optional solution, a time domain resource corresponding to the first time-frequency resource includes one or more first symbols, the first symbol is an $N^{th}$ symbol in a second-type time unit, and N is a positive integer. Specifically, the second-type time unit may be a radio frame, a slot, or a subframe. A plurality of consecutive radio frames, slots, or subframes form one superframe, and one radio frame includes a plurality of subframes. A length of one slot is usually less than or equal to a length of one subframe. In an implementation, the first symbol is symbols with a same sequence number in at least one radio frame. For example, in 48 consecutive radio frames, each radio frame includes a symbol #0, a symbol #1, a symbol #2, a symbol #3, a first guard period, a symbol #4, a symbol #5, a symbol #6, a symbol #7, and a second guard period. Sequence numbers corresponding to the symbol #0, the symbol #1, the symbol #2, the symbol #3, the first guard period, the symbol #4, the symbol #5, the symbol #6, the symbol #7, and the second guard period are respectively 1, 2, 3, 4, 5, 6, 7, 8, 9, and 10. In this case, the first symbol is symbols with a same sequence number in one or more of the radio frames, for example, a symbol with a sequence number 3 in one or more radio frames, namely, the symbol #2. It should be noted herein that the "sequence number" described above is merely used to explain a sequence and a location of a symbol, and there may be no actual sequence number in an actual communication system.

In an example, the first symbol is the first symbol in the second-type time unit. For example, in 48 consecutive radio frames, each radio frame includes a symbol #0, a symbol #1, a symbol #2, a symbol #3, a first guard period, a symbol #4, a symbol #5, a symbol #6, a symbol #7, and a second guard period. Sequence numbers corresponding to the symbol #0, the symbol #1, the symbol #2, the symbol #3, the first guard period, the symbol #4, the symbol #5, the symbol #6, the symbol #7, and the second guard period are respectively 1, 2, 3, 4, 5, 6, 7, 8, 9, and 10. The first symbol is the first symbol in one or more second-type time units, for example, a symbol whose sequence number is 1 in one or more radio frames. In other words, the symbol #0 in one or more radio frames in the 48 consecutive radio frames is the first symbol.

In the solution of this application, the first symbol may be configured or defined as the first symbol in the one or more second-type time units. The first symbol is a symbol used for downlink transmission, and the first symbol in the second-type time unit is a symbol always used for downlink transmission in various uplink/downlink resource configurations. Therefore, this solution can ensure that the first symbol may exist in the second-type time unit in various uplink/downlink resource configurations.

In another optional solution, the frequency domain resource of the first time-frequency resource is all valid frequency domain resources in a 20 megahertz bandwidth. All the valid frequency domain resources in the 20 megahertz bandwidth are frequency domain resources in the 20 megahertz bandwidth other than a bandwidth used as a guard period, or frequency domain resources in the 20 megahertz bandwidth other than a bandwidth used as a guard period and a direct current component subcarrier. Specifically, a 20 megahertz (MHz) channel determined based on a 480 kilohertz (kHz) subcarrier spacing may include 41.67 subcarriers in total. However, in practice, parts of bandwidth on two sides of the 20 MHz bandwidth are used as guard periods, and there are remaining, for example, 40 subcarriers other than the guard periods. The 40 subcarriers include one or more subcarriers used to suppress a direct current component, and these subcarriers are referred to as direct current component subcarriers for short. In this case, the frequency domain resource of the first time-frequency resource may be the 40 subcarriers in the 20 megahertz bandwidth or a subcarrier other than the one or more direct current component subcarriers in the 40 subcarriers in the 20 megahertz bandwidth. By using as many subcarriers as possible to transmit signals or signaling, a maximum frequency diversity gain can be obtained.

Step S403: The another device receives the first signal from the first device.

Step S404: The first device generates a first message.

Specifically, this step is an optional step. The first message includes time domain resource information and/or cyclic prefix (cyclic prefix, CP) length information of a second time-frequency resource. A time domain resource of the second time-frequency resource is a resource used to send the first message, and the time domain resource information of the second time-frequency resource may be a time domain resource sequence number such as a frame number, a slot number, or a superframe number corresponding to the second time-frequency resource, or a part of the sequence number. For example, the sequence number is represented by using a 10-bit binary system, and the time domain resource information is binary numbers corresponding to the second bit to the fourth bit of the sequence number.

Step S405: The first device sends the first message to the another device on the second time-frequency resource.

Specifically, the first message includes the time domain resource information and/or the cyclic prefix length corresponding to the second time-frequency resource. The time domain resource information and/or the CP length corresponding to the second time-frequency resource may be a part of system configuration information. The system configuration information is information used to indicate a basic configuration parameter of a communication domain, for example, one or more of system bandwidth information, identity information of the communication domain, resource configuration information of a channel, resource configuration information of a signal, a CP length, uplink/downlink resource configuration information, the time domain resource information corresponding to the second time-frequency resource, or the like. The first message is sent by the first device, and may have a periodic feature. A period of the first message is specified in a protocol. Alternatively, the first message may be sent aperiodically through triggering.

The first message includes the cyclic prefix length information, so that a cyclic length may be directly determined based on the cyclic length information, without blindly detecting a relationship between a primary synchronization signal and a secondary synchronization signal to determine the cyclic prefix length, thereby reducing implementation complexity.

In an optional solution, the first device may further send the first message on the second time-frequency resource through the first antenna port. Specifically, both the first signal and the first message are transmitted through the first antenna port. In this case, the first signal may be used to demodulate the first message, so that the device that receives the first message does not need to additionally receive a reference signal used for demodulation, thereby reducing resources and a delay. Correspondingly, the first device does not need to additionally send the reference signal used to demodulate the first message.

Step S406: The another device receives the first message from the first device on the second time-frequency resource.

In an optional solution, the another device receives the first message from the first device on the second time-frequency resource through the first antenna port.

Step S407: The first device generates a second message.

Step S408: The first device sends the second message to the another device on a third time-frequency resource.

In an optional solution, the first device sends the second message to the another device on the third time-frequency resource through the first antenna port.

Specifically, both the first signal and the second message are transmitted through the first antenna port. In this case, the first signal may be used to demodulate the second message, so that the device that receives the second message does not need to additionally receive a reference signal used for demodulation, thereby reducing resources and a delay. Correspondingly, the first device does not need to additionally send the reference signal used to demodulate the second message.

The first message in step 405 includes at least one of the following: information about the third time-frequency resource, symbol quantity information of the third time-frequency resource, period information of the second message, size information of the second message, or modulation and coding scheme information of the second message. The third time-frequency resource is used to send the second message, and the information about the third time-frequency resource is used to indicate the third time-frequency resource. An indication manner may include the following three examples. In an example, the information about the third time-frequency resource may be an index. Correspondingly, the third time-frequency resource is determined based on the index. In another example, the information about the third time-frequency resource may be the third time-frequency resource. In another example, the information about the third time-frequency resource may be a parameter. Correspondingly, the third time-frequency resource is determined based on the parameter and a preset (for example, specified in a protocol) rule or formula. The symbol quantity information of the third time-frequency resource is used to indicate a symbol quantity of the third time-frequency resource. For an indication manner, refer to the foregoing manner in which the information about the third time-frequency resource indicates the third time-frequency resource. Details are not described herein again. The period information of the second message is used to indicate a period of the second message. For an indication manner, refer to the foregoing manner in which the information about the third time-frequency resource indicates the third time-frequency resource. Details are not described herein again. The size information of the second message is used to indicate a size of the second message. The modulation and coding scheme information of the second message is used to indicate a modulation and coding scheme of the second message. For an indication manner, refer to the foregoing manner in which the information about the third time-frequency resource indicates the third time-frequency resource. Details are not described herein again. Correspondingly, after the first message is received, the third time-frequency resource, the period of the second message, the size of the second message, or the modulation and coding scheme of the second message is determined based on the information about the third time-frequency resource, the period information of the second message, the size information of the second message, or the modulation and coding scheme information of the second message in the first message.

In an example, when the first message includes the information about the third time-frequency resource, after the first message is received, the third time-frequency resource is determined based on the information about the third time-frequency resource in the first message, and then the second message is received on the third time-frequency resource. In another example, when the first message includes the period information of the second message and the size information of the second message, because a method for determining a resource location based on a period and a size is specified in a protocol, the period of the second message and the size of the second message are determined based on the period information of the second message and the size information of the second message, so as to determine the resource location, and then the second message is received at the corresponding resource location. In another example, the first message includes the modulation and coding scheme information of the second message. Correspondingly, after the first message is obtained, the modulation and coding scheme of the second message may be determined based on the modulation and coding scheme information of the second message in the first message, so as to determine the modulation scheme and the coding scheme for receiving the second information.

In the foregoing manner, the first message includes information related to the second message, and the information related to the second message, such as at least one of the resource location, the coding scheme, and the modulation scheme, can be directly determined based on the first message, to reduce or avoid blind detection on the second message and ensure system scalability. The system may be further applied to different channel conditions, service requirements, and device requirements, and has good scalability.

In another optional solution, the first message includes at least one of the following: information about a sixth time-frequency resource, symbol quantity information of the sixth time-frequency resource, period information of a fifth message, size information of the fifth message, or modulation and coding scheme information of the fifth message. The sixth time-frequency resource is used to send the fifth message. The information about the sixth time-frequency resource is used to indicate the sixth time-frequency resource, the symbol quantity information of the sixth time-frequency resource is used to indicate a symbol quantity of the sixth time-frequency resource, the period information of the fifth message is used to indicate a period of the fifth message, the size information of the fifth message is used to indicate a size of the fifth message, or the modulation and coding scheme information of the fifth message is used to indicate a modulation and coding scheme of the fifth message. For an indication manner, refer to the foregoing manner in which the information about the third time-frequency resource indicates the third time-frequency resource. Details are not described herein again.

In the foregoing manner, the first message includes information related to the fifth message, and the information related to the fifth message, such as at least one of a resource location, a coding scheme, and a modulation scheme, can be determined based on the first message, to reduce or avoid blind detection on the fifth message and ensure system scalability. In addition, the size, the modulation and coding scheme, the period, a resource, and the like of the fifth message that are included in the first message may all change. Therefore, the system is applicable to different channel conditions, service requirements, and device requirements, and has good scalability.

In another optional solution, the time domain resource corresponding to the second time-frequency resource includes one or more first symbols. The first symbol is an $N^{th}$ symbol in a second-type time unit, and N is a positive integer. Optionally, the first symbol is the first symbol in the second-type time unit. In other words, N is equal to 1. For details, refer to step S402. Details are not described herein again.

In another optional solution, the first message may further include uplink/downlink resource configuration information. The uplink/downlink resource configuration information may indicate a resource used to transmit uplink control information or an uplink control signal and/or a resource used to transmit downlink control information or a downlink control signal, or may indicate a resource used to transmit uplink service data and/or a resource used to transmit downlink service data (that is, does not include control information or a control signal). The resource configuration information may indicate a specific resource location or a resource quantity or proportion. In an example, a radio frame is used as example, and the radio frame includes a symbol #0, a symbol #1, a symbol #2, a symbol #3, a first guard period, a symbol #4, a symbol #5, a symbol #6, a symbol #7, and a second guard period. The resource configuration information indicates that the symbol #0, the symbol #1, the symbol #2, and the symbol #3 are used to transmit downlink service data, and the symbol #4, the symbol #5, the symbol #6, and the symbol #7 are used to transmit uplink service data. In another example, a radio frame includes a symbol #0, a symbol #1, a symbol #2, a symbol #3, a first guard period, a symbol #4, a symbol #5, a symbol #6, a symbol #7, and a second guard period. The resource configuration information indicates that a ratio of resources used to transmit uplink control information to resources used to transmit downlink control information is 3:5.

In an optional solution, a frequency domain resource of the second time-frequency resource includes all the valid frequency domain resources in the 20 megahertz bandwidth. For details, refer to step S402. Details are not described herein again.

In another optional solution, the first message is a broadcast message, for example, an MIB message, and the first message may be sent by using a physical broadcast channel (physical broadcast channel, PBCH).

The second message in step S407 includes system identifier information and/or information about a first resource, and the first resource is used to bear an access request. The system identifier information may be an identity of a communication domain, a cell identity, or the like. The first resource is used by the first device to receive the access request, and the access request is a signal or signaling sent by another device (for example, an external node) to the first device (a primary node of the communication domain) to request to join the communication domain.

The second message includes the system identifier information and/or the information about the first resource, so that a system identifier can be directly determined based on the second message, the first resource can be determined based on the information about the first resource, and a resource location of the access request can be directly determined based on the first resource configured by the first device. In addition, in a manner of configuring the first resource of the access request in the system, insufficiency or excessive waste of the resource is avoided, and system scalability is improved.

In an optional solution, before step S408, the first device sends scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message. The third time-frequency resource is used to send the second message, and the information about the third time-frequency resource is used to indicate the third time-frequency resource. An indication manner may include the following three examples. In an example, the information about the third time-frequency resource may be an index. Correspondingly, the third time-frequency resource is determined based on the index. In another example, the information about the third time-frequency resource may be the third time-frequency resource. In another example, the information about the third time-frequency resource may be a parameter. Correspondingly, the third time-frequency resource is determined based on the parameter and the preset (for example, specified in the protocol) rule or formula. The symbol quantity information of the third time-frequency resource is used to indicate the symbol quantity of the third time-frequency resource, the period information of the second message is used to indicate the period of the second message, the size information of the second message is used to indicate the size of the second message, and the modulation and coding scheme information of the second message is used to indicate the modulation and coding scheme of the second message. For an indication manner, refer to the foregoing manner in which the information about the third time-frequency resource indicates the third time-frequency resource. Details are not described herein again. Correspondingly, after the scheduling information is received, the third time-frequency resource, the period of the second message, the size of the second message, or the modulation and coding scheme of the second message is determined based on at least one of the following in the scheduling information: the information about the third time-frequency resource, the period information of the second message, the size information of the second message, or the modulation and coding scheme information of the second message.

In an example, when the scheduling information includes the information about the third time-frequency resource, after the scheduling information is received, the third time-frequency resource is determined based on the information about the third time-frequency resource in the scheduling information, and then the second message is received on the third time-frequency resource. In another example, when the scheduling information includes the period information of the second message and the size information of the second message, because the method for determining a resource location based on a period and a size is specified in the protocol, the period of the second message and the size of the second message are determined based on the period information of the second message and the size information of the second message, so as to determine the resource location, and then the second message is received at the corresponding resource location. In another example, the scheduling information includes the modulation and coding scheme information of the second message. Correspondingly, after the scheduling information is obtained, the modulation and coding scheme of the second message may be determined based on the modulation and coding scheme information of the second message in the scheduling information, to determine the modulation scheme and the coding scheme for receiving the second information.

In this case, information related to the scheduling information may be obtained by using the first message. In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information. The fourth time-frequency resource is used to send the scheduling information, and the information about the fourth time-frequency resource is used to indicate the fourth time-frequency resource. In an example, the information about the fourth time-frequency resource may be an index. Correspondingly, the fourth time-frequency resource is determined based on the index. In another example, the information about the fourth time-frequency resource may be the fourth time-frequency resource. In another example, the information about the fourth time-frequency resource may be a parameter. Correspondingly, the fourth time-frequency resource is determined based on the parameter and a preset (for example, specified in a protocol) rule or formula. The symbol quantity information of the fourth time-frequency resource is used to indicate a symbol quantity of the fourth time-frequency resource, the size information of the scheduling information is used to indicate a size of the scheduling information, the aggregation level information of the scheduling information is used to indicate an aggregation level of the scheduling information, and the modulation and coding scheme information of the scheduling information is used to indicate a modulation and coding scheme of the scheduling information. For an indication manner, refer to the foregoing manner in which the information about the fourth time-frequency resource indicates the fourth time-frequency resource. Details are not described herein again. Correspondingly, after the first message is received, the fourth time-frequency resource, the size of the scheduling information, the aggregation level of the scheduling information, or the modulation and coding scheme of the scheduling information is determined based on at least one of the following in the first message: the information about the fourth time-frequency resource, the size information of the scheduling information, the aggregation level information of the scheduling information, or the modulation and coding scheme information of the scheduling information.

In an example, when the first message includes the information about the fourth time-frequency resource, after the first message is received, the fourth time-frequency resource is determined based on the information about the fourth time-frequency resource in the first message, and then the scheduling information is received on the fourth time-frequency resource. In another example, the first message includes the modulation and coding scheme information of the scheduling information. Correspondingly, after the first message is obtained, the modulation and coding scheme of the scheduling information may be determined based on the modulation and coding scheme information of the scheduling information in the first message, to determine a modulation scheme and a coding scheme for receiving the scheduling information.

The scheduling information is sent. The scheduling information includes the related information of the second message, and the related information of the scheduling information mation may be obtained based on the first message, to reduce or avoid blind detection on the second message and ensure system scalability. In addition, the size, the modulation and coding scheme, the period, the resource, and the like of the second message that are included in the first message may all change. Therefore, the system is applicable to different channel conditions, service requirements, and device requirements, and has good scalability.

In another optional solution, the second message may further include uplink/downlink resource configuration information. For details, refer to step S405. Details are not described herein again.

In another optional solution, a time domain resource corresponding to the third time-frequency resource and/or a time domain resource corresponding to the fourth time-frequency resource include/includes one or more first symbols, the first symbol is an $N^{th}$ symbol in a second-type time unit, and N is a positive integer. Optionally, the first symbol is the first symbol in the second-type time unit. For details, refer to step S402. Details are not described herein again.

In another optional solution, a frequency domain resource of the third time-frequency resource and/or the fourth time-frequency resource includes all the valid frequency domain resources in the 20 megahertz bandwidth. For details, refer to step S402. Details are not described herein again.

Step S409: The another device receives the second message from the first device on the third time-frequency resource.

In an optional solution, the another device receives the second message on the third time-frequency resource through the first antenna port.

Step S410: The first device sends a third message to the another device on a fifth time-frequency resource.

Specifically, this step is an optional step, the third message is used to indicate a second resource, and the second resource is used to transmit at least one of a first control-type signal or first control-type signaling.

In an optional solution, the first device sends the third message on the fifth time-frequency resource through the first antenna port.

Specifically, both the first signal and the third message are transmitted through the first antenna port. In this case, the first signal may be used to demodulate the third message, so that the device that receives the third message does not need to additionally receive a reference signal used for demodulation, thereby reducing resources and a delay. Correspondingly, the first device does not need to additionally send the reference signal used to demodulate the third message.

The second resource is directly indicated in the third message, and the resource used to transmit the first control-type signal or signaling may be determined based on the third message. In a manner of configuring the resource in the system, insufficiency or excessive waste of the resource is avoided, and system scalability is improved. In addition, the third message is periodically sent, so that resource configuration information indicated by the third message can be quickly and flexibly changed, to adapt to changes of a channel condition and a service requirement.

In an optional solution, the first message in step S405 may further include information used to indicate a third resource, and/or the second message in step S407 may further include information used to indicate a fourth resource, where the third resource and/or the fourth resource are/is used to transmit at least one of the first control-type signal or signaling. In a possible implementation, one or more of the second resource, the third resource, or the fourth resource are used to transmit a same first control-type signal or same first control-type signaling or different first control-type signals or signaling.

Specifically, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by the first device, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first device.

Specifically, the acknowledgment feedback information may be acknowledgment (acknowledgment, ACK) feedback, and the negative acknowledgment feedback information may be negative acknowledgment (negative-acknowledgment, NACK) feedback. The phase tracking reference signal is used for phase tracking, the positioning reference signal is used for positioning, and the channel state information reference signal is used for channel state estimation.

The first message includes the third resource, and the second message includes the fourth resource. After the first message and the second message are obtained, the resource for transmitting the first control-type signal or signaling may be directly determined. This is simple and convenient. In a manner of configuring the resource in the system, insufficiency or excessive waste of the resource is avoided, and system scalability is improved.

The information used to indicate the resource for transmitting the first control-type signal/signaling may be in different messages. Details are specifically as follows:

In a first case, one of the first message, the second message, or the third message includes the information used to indicate the resource for transmitting the first control-type signal or signaling. For example, the first message includes information used to indicate the third resource, and the third resource is determined based on the information used to indicate the third resource. The third resource is used by the first device to receive the access request signaling or signal. For example, the first message includes information used to indicate the third resource, and the third resource is determined based on the information used to indicate the third resource. The third resource is used by the first device to send the synchronization signal and used by the first device to receive the scheduling request signaling or signal.

In a second case, two of the first message, the second message, or the third message include the information used to indicate the resource for transmitting the first control-type signal or signaling, but the other message does not include the information used to indicate the resource for transmitting the first control-type signal or signaling. The two messages may include information used to indicate resources for transmitting different first control-type signals or signaling, or may include information used to indicate resources for transmitting a same first control-type signal or same first control-type signaling. For example, the first message includes information used to indicate the third resource, the third resource is determined based on the information used to indicate the third resource, and the third resource is used by the first device to send the synchronization signal. In addition, the second message includes information used to indicate the fourth resource, the fourth resource is determined based on the information used to indicate the fourth resource, and the fourth resource is also used by the first device to send the synchronization signal. For example, the first message includes information used to indicate the third resource, the third resource is determined based on the information used to indicate the third resource, and the third resource is used by the first device to send the synchronization signal. In addition, the second message includes information used to indicate the fourth resource, the fourth resource is determined based on the information used to indicate the fourth resource, and the fourth resource is used by the first device to send the demodulation reference signal.

In a third case, the first message, the second message, and the third message all include the information used to indicate the resource for transmitting the first control-type signal or signaling, and may include information used to indicate resources for transmitting a same first control-type signal or same first control-type signaling, or may include information used to indicate resources for transmitting different first control-type signals or signaling. When the information used to indicate the resources for transmitting different first control-type signals or signaling is included, two of the messages may further include the information used to indicate the resources for transmitting the same first control-type signal or signaling. For example, the first message includes information used to indicate the third resource, the third resource is determined based on the information used to indicate the third resource, and the third resource is used by the first device to send the synchronization signal. In addition, the second message includes information used to indicate the fourth resource, the fourth resource is determined based on the information used to indicate the fourth resource, and the fourth resource is also used by the first device to send the synchronization signal. In addition, the third message includes information used to indicate the second resource, the second resource is determined based on the information used to indicate the second resource, and the second resource is also used by the first device to send the synchronization signal. For example, the first message includes information used to indicate the third resource, the third resource is determined based on the information used to indicate the third resource, and the third resource is used by the first device to send the synchronization signal. In addition, the second message includes information used to indicate the fourth resource, the fourth resource is determined based on the information used to indicate the fourth resource, and the fourth resource is used by the first device to send the demodulation reference signal. The third message includes information used to indicate the second resource, the second resource is determined based on the information used to indicate the second resource, and the second resource is used by the first device to receive the acknowledgment/negative acknowledgment feedback information. For example, the first message includes information used to indicate the third resource, the third resource is determined based on the information used to indicate the third resource, and the third resource is used by the first device to send the synchronization signal. In addition, the second message includes information used to indicate the fourth resource, the fourth resource is determined based on the information used to indicate the fourth resource, and the fourth resource is used by the first device to send the demodulation reference signal. The third message includes information used to indicate the second resource, the second resource is determined based on the information used to indicate the second resource, and the second resource is also used by the first device to send the demodulation reference signal.

In another optional solution, a time domain resource of at least one of the second resource, the third resource, the fourth resource, the fifth resource, or the sixth resource includes one or more second symbols.

Specifically, the second symbol is a last symbol or a plurality of last consecutive symbols used for downlink transmission and/or a first symbol or a plurality of first consecutive symbols used for uplink transmission in a second-type time unit. Optionally, a quantity of second symbols in the second-type time unit may be a fixed value, or may be predefined or preconfigured. Downlink transmission means that the first device (which may be a primary node in a communication domain) sends service data to another device (which may be a secondary node in the communication domain), and uplink transmission means that another device (which may be a secondary node in a communication domain, or may be an external node) sends service data to the first device (which may be a primary node in the communication domain). The second-type time unit may be a radio frame. For example, the radio frame includes a symbol #0, a symbol #1, a symbol #2, a symbol #3, a first guard period, a symbol #4, a symbol #5, a symbol #6, a symbol #7, and a second guard period. The symbol #2 and the symbol #3 are the last two consecutive symbols used for downlink transmission in the radio frame, and/or the symbol #4 is the first symbol used for uplink transmission in the radio frame. In this case, the symbol #2, the symbol #3, and the symbol #4 are all second symbols.

In the foregoing method, a location of the second symbol can be quickly determined by using the foregoing rule, so as to determine the resource used to transmit the first control-type signal or signaling.

In another optional solution, the first message, the second message, and/or the third message include/includes first information. The first information may be used to indicate the location of the second symbol and/or a structure of the second-type time unit. Optionally, the first information includes rule indication information, and the rule indication information is used to indicate at least one of a plurality of rules. The plurality of rules include a first rule or a second rule. In an implementation, the rule indication information may indicate the first rule or the second rule by using one bit. It should be noted herein that the structure of the second-type time unit includes composition of the second-type time unit, for example, types of a plurality of symbols included in the second-type time unit, and may specifically include: which symbols in the plurality of symbols are uplink symbols, which symbols are downlink symbols, which symbols are special symbols, and/or the like. Optionally, when the second-type time unit is a radio frame, a structure of the second-type time unit is a frame structure.

Specifically, location information of the second symbol may be indicated by the first message, the second message, and/or the third message, or may be specified in a protocol. For an indication manner, refer to the manner in which the information about the third time-frequency resource indicates the third time-frequency resource in step S408. Details are not described herein again.

In another optional solution, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol.

Figure 5:
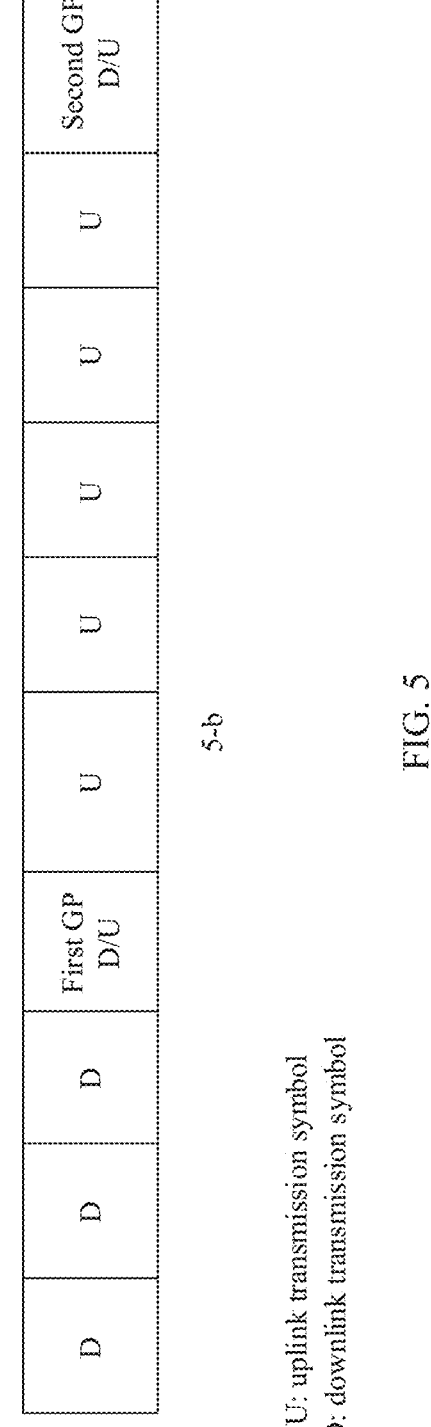
FIG. 5 is a schematic diagram of two different basic uplink-downlink configuration ratios according to an embodiment of the present invention.

FIG. 5 is a schematic diagram of two different basic uplink-downlink configuration ratios. 5-a in FIG. 5 indicates that a ratio of a quantity of downlink symbols to a quantity of uplink symbols is 4:4. In other words, a basic uplink-downlink configuration ratio is 4:4. 5-b in FIG. 5 indicates that a ratio of a quantity of downlink symbols to a quantity of uplink symbols is 3:5. In other words, a basic uplink-downlink configuration ratio is 3:5. The second-type time unit may be a radio frame, a subframe, or a slot.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, the location of the second symbol is determined by using a preset rule. In this manner, a specific rule type may not need to be indicated.

In another optional solution, the preset rule is the first rule or the second rule.

The following describes an implementation of the first rule by using an example in which the second-type time unit is a radio frame.

For example, the basic uplink-downlink configuration ratio is 3:5. A manner of determining, based on the first rule, a frame structure of a radio frame having no first symbol and a location of the second symbol is shown in FIG. 6. In a frame structure represented by 6-a in FIG. 6, a basic uplink-downlink configuration ratio is 3:5, quantities of first symbols and second symbols are both 0, and the radio frame includes a symbol #0, a symbol #1, a symbol #2, a guard period GP, a symbol #3, a symbol #4, a symbol #5, a symbol #6, a symbol #7, and a guard period GP. The symbol #0, the symbol #1, and the symbol #2 are used for downlink transmission, and a quantity of downlink symbols is 3. The symbol #3, the symbol #4, the symbol #5, the symbol #6, and the symbol #7 are used for uplink transmission, and a quantity of uplink symbols is 5. A frame structure represented by 6-b in FIG. 6 includes one downlink second symbol, where a symbol #2 is the second symbol. A frame structure represented by 6-c in FIG. 6 includes one uplink second symbol, where a symbol #2 is the second symbol. A frame structure represented by 6-d in FIG. 6 includes two downlink second symbols, where a symbol #1 and a symbol #2 are the second symbols. A frame structure 6-e in FIG. 6 includes two uplink second symbols, where a symbol #1 and a symbol #2 are the second symbols. A frame structure represented by 6-f in FIG. 6 includes one uplink second symbol and one downlink second symbol, where a symbol #1 and a symbol #2 are the second symbols.

For example, the basic uplink-downlink configuration ratio is 3:5. A manner of determining, based on the first rule, a frame structure of a radio frame having one first symbol and a location of the second symbol is shown in FIG. 7. 7-*a* in FIG. 7 represents a frame structure of a radio frame whose basic uplink-downlink configuration ratio is 3:5 and in which quantities of first symbols and second symbols are both 0. 7-*b* in FIG. 7 shows a frame structure corresponding to a radio frame having no second symbol and one first symbol and a location of the first symbol, where a symbol #0 is the first symbol. A frame structure 7-*c* in FIG. 7 includes one downlink second symbol and one first symbol, where a symbol #0 is the first symbol, and a symbol #2 is the second symbol. A frame structure 7-*d* in FIG. 7 includes one uplink second symbol and one first symbol, where a symbol #0 is the first symbol, and a symbol #2 is the second symbol.

The following describes an implementation of the second rule by using an example in which the second-type time unit is a radio frame.

For example, the basic uplink-downlink configuration ratio is 3:5. A manner of determining, based on the second rule, a frame structure of a radio frame having no first symbol and a location of the second symbol is shown in FIG. 8. 8-*a* in FIG. 8 represents a radio frame whose basic uplink-downlink configuration ratio is 3:5 and in which quantities of first symbols and second symbols are both 0. 8-b in FIG. 8 shows a frame structure corresponding to a radio frame having one downlink second symbol and no first symbol and a location of the second symbol, where a symbol #3 is the second symbol. 8-*c* in FIG. 8 shows a frame structure corresponding to a radio frame having one uplink second symbol and no first symbol and a location of the second symbol, where a symbol #3 is the second symbol. 8-*d* in FIG. 8 shows a frame structure corresponding to a radio frame having two downlink second symbols and no first symbol and locations of the second symbols, where a symbol #3 and a symbol #4 are the second symbols. 8-*e* in FIG. 8 shows a frame structure corresponding to a radio frame having two uplink second symbols and no first symbol and locations of the second symbols, where a symbol #3 and a symbol #4 are the second symbols. 8-*f* in FIG. 8 shows a frame structure corresponding to a radio frame having one uplink second symbol, one downlink second symbol, and no first symbol and locations of the second symbols, where a symbol #3 and a symbol #4 are the second symbols.

For example, the basic uplink-downlink configuration ratio is 3:5. A manner of determining, based on the second rule, a frame structure of a radio frame having one first symbol and a location of the second symbol is shown in FIG. 9. 9-*a* in FIG. 9 represents a radio frame whose basic uplink-downlink configuration ratio is 3:5 and in which quantities of first symbols and second symbols are both 0. 9-*b* in FIG. 9 shows a frame structure corresponding to a radio frame having no second symbol and one first symbol and a location of the first symbol, where a symbol #0 is the first symbol. 9-*c* in FIG. 9 shows a frame structure corresponding to a radio frame having one uplink second symbol and one first symbol and locations of the first symbol and the second symbol, where a symbol #0 is the first symbol, and a symbol #4 is the second symbol. 9-*d* in FIG. 9 shows a frame structure corresponding to a radio frame having one uplink second symbol and one first symbol and locations of the first symbol and the second symbol, where a symbol #0 is the first symbol, and a symbol #4 is the second symbol.

In FIG. 6, FIG. 7, FIG. 8, and FIG. 9, (D) indicates that a corresponding symbol is used for downlink transmission, and (U) indicates that a corresponding symbol is used for uplink transmission.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

Specifically, the first-type time unit may be a superframe, a radio frame group, a slot group, or a subframe group, and the radio frame group includes Z radio frames, where Z is specified in a protocol, configured by the first device, or preconfigured by the system. For example, system pre-configuration may be writing a related pre-configuration parameter when the device is delivered from a factory or maintained. Optionally, a parameter value is specified by a regional regulation or a technical standard, specified by a related national standard or industry standard, or determined by a device vendor. The first-type time unit may be a superframe, a radio frame group, a slot group, or a subframe group. The first-type time unit may include a plurality of second-type time units, and the second-type time unit may be a radio frame, a slot, or a subframe. The second-type time unit includes a symbol and a guard period. The time domain resource corresponding to the second resource may be a plurality of symbols, the time domain resource corresponding to the third resource may be a plurality of symbols, and the time domain resource corresponding to the fourth resource may be a plurality of symbols. The symbol may be an orthogonal frequency division multiplexing (orthogonal frequency division multiplexing, OFDM) symbol or a single carrier frequency division multiple access (single carrier frequency division multiple access, SCFDMA) symbol. The symbol quantity information of the second resource may be an index. Correspondingly, a symbol quantity of the second resource is determined based on the index. The symbol quantity information of the second resource may be the symbol quantity of the second resource. Alternatively, the symbol quantity information of the second resource may be a parameter. Correspondingly, the symbol quantity of the second resource is determined based on the parameter and a preset (specified in a protocol) rule or formula. The symbol quantity information of the third resource and the symbol quantity information of the fourth resource are similar to the symbol quantity information of the second resource. Details are not described herein again.

In another optional solution, a time domain resource corresponding to the fifth time-frequency resource includes one or more first symbols, the first symbol is an $N^{th}$ symbol in a second-type time unit, and N is a positive integer. Optionally, the first symbol is the first symbol in the second-type time unit. For details, refer to step S402. Details are not described herein again.

In another optional solution, the third message may further include uplink/downlink resource configuration information. For details, refer to step S405. Details are not described herein again.

In another optional solution, a frequency domain resource of the fifth time-frequency resource includes all the valid frequency domain resources in the 20 megahertz bandwidth. For details, refer to step S402. Details are not described herein again.

Step S411: The another device receives the third message from the first device on the fifth time-frequency resource.

In an optional solution, the another device receives the third message from the first device on the fifth time-frequency resource through the first antenna port.

In another optional solution, a quantity of symbols in each second-type time unit is determined based on a symbol quantity M of the second resource and a predefined rule, where the first-type time unit includes K second-type time units, and both M and K are positive integers. The predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

Specifically, the second-type time unit may be a radio frame, a slot, or a subframe. For example, it is assumed that the symbol quantity M of the second resource is 54, one first-type time unit is one superframe, the first-type time unit includes K second-type time units, and K is 48. In other words, 48 consecutive radio frames are one superframe. A process of determining the quantity of symbols in each second-type time unit based on the predefined rule and the symbol quantity 54 of the second resource is as follows: 54 exactly divided by 48 is equal to 1, with a remainder of 6. In this case, there are two symbols in the first six second-type time units in the first-type time unit, and there is one symbol in the $7^{th}$ to the $48^{th}$ second-type time units.

Step S412: The first device sends the fifth message to the another device on the sixth time-frequency resource.

Specifically, the fifth message is used to indicate a resource for the service data of the first service type. The first service type includes one or more service types, the service data of the first service type includes service data of the one or more service types, and different service types are distinguished by respective service type identifiers. For example, the service data of the first service type is an active noise reduction service or the service data of the first service type includes an active noise reduction service. Alternatively, the service data of the first service type includes services of one or more priorities. Alternatively, the service data of the first service type includes services of one or more quality of service (quality of service, QoS) types. Alternatively, the service data of the first service type includes a service that uses one or more transmission modes. The transmission mode may be distinguished based on transparent transmission or non-transparent transmission at one or more protocol layers, or may be distinguished based on whether feedback or a feedback manner is included, or may be distinguished based on a quantity of antenna ports used to transmit a corresponding service, or may be distinguished based on a combination of the foregoing manners.

The first device sends the fifth message, and the fifth message is used to indicate the resource used for the service data of the first service type. The first device directly configures the resource for the service data of the first service type. In a manner of configuring the resource in the system, insufficiency or excessive waste of the resource is avoided, and system scalability is improved. In addition, the resource used for the service data of the first service type may be excluded from resources indicated by scheduling signaling, thereby simplifying scheduling signaling of service data other than the service data of the first service type.

In an optional solution, the fifth message is used to indicate a frequency domain resource that is in each symbol of the second-type time unit and that is used for the service data of the first service type.

Specifically, the second-type time unit may be a radio frame, and there are two cases for each symbol of the second-type time unit: In a first case, each symbol of the second-type time unit means each of all symbols in the second-type time unit. For example, FIG. 10 is a schematic diagram of symbols in a radio frame. One superframe includes 48 radio frames (second-type time units), and the radio frame includes a symbol #0, a symbol #1, a symbol #2, a symbol #3, a first guard period, a symbol #4, a symbol #5, a symbol #6, a symbol #7, and a second guard period. All symbols in the second-type time unit include the symbol #0, the symbol #1, the symbol #2, the symbol #3, the symbol #4, the symbol #5, the symbol #6, and the symbol #7.

In a second case, each symbol of the second-type time unit includes each symbol that can be used for the service data of the first service type in the second-type time unit, and a symbol in one or more second-type time units that has been indicated to be used to transmit the first control-type signaling or signal is not included herein (the symbol used to transmit the first control-type signaling or signal is briefly referred to as a special symbol below). FIG. 10 is a schematic diagram of symbols in a radio frame. One superframe includes 48 radio frames (second-type time units). The radio frame includes a symbol #0, a symbol #1, a symbol #2, a symbol #3, a first guard period, a symbol #4, a symbol #5, a symbol #6, a symbol #7, and a second guard period. The 48 radio frames include 60 special symbols (the first symbols and/or the second symbols). The symbol #2 and the symbol #3 in the first 12 radio frames are special symbols (symbols indicated to be used for the first control-type signaling or signal). The symbol #3 in the 13th to the 48th radio frames is a special symbol (a symbol indicated to be used for the first control-type signaling or signal). In this case, the fifth message is used to indicate frequency domain resources that are used for the service data of the first service type and that are in the symbol #0, the symbol #1, the symbol #4, the symbol #5, the symbol #6, and the symbol #7 in each of the 48 radio frames.

For example, there are 60 special symbols (first symbols and/or second symbols) in the 48 radio frames. The symbol #0 and the symbol #3 in the first two radio frames are special symbols, the symbol #2 and the symbol #3 in the $3^{rd}$ to $12^{th}$ radio frames are special symbols, and the symbol #3 in the $13^{th}$ to $48^{th}$ radio frames are special symbols. In this case, the fifth message is used to indicate frequency domain resources that are in the symbol #1, the symbol #2, the symbol #4, the symbol #5, the symbol #6, and the symbol #7 in each of the first two radio frames in the 48 radio frames and that are used for the service data of the first service type and frequency domain resources that are in the symbol #0, the symbol #1, the symbol #4, the symbol #5, the symbol #6, and the symbol #7 in each of the 3rd to the 48th radio frames in the 48 radio frames and that are used for the service data of the first service type. In a possible implementation, frequency domain resources that are in the symbol #1 and the symbol #2 in the first two radio frames and that are used for the service data of the first service type are respectively the same as frequency domain resources that are in the symbol #0 and the symbol #1 in the $3^{rd}$ to 48th radio frames and that are used for the service data of the first service type. In this case, for the 48 radio frames, if frequency domain resources that are used for the service data of the first service type and that are in each of six symbols are indicated, time-frequency resources used for the service data of the first service type in the 48 radio frames may be determined. The six symbols sequentially correspond to the symbol #1, the symbol #2, the symbol #4, the symbol #5, the symbol #6, and the symbol #7 in the first two radio frames, and sequentially correspond to the symbol #0, the symbol #1, the symbol #4, the symbol #5, the symbol #6, and the symbol #7 in the $3^{rd}$ to the $48^{th}$ radio frames. In this way, an indication manner can be simplified, and a quantity of symbols that can be used to transmit the service data of the first service type can be increased.

In another optional solution, a time domain resource corresponding to the sixth time-frequency resource includes one or more first symbols. The first symbol is an $N^{th}$ symbol in a second-type time unit, and N is a positive integer. Optionally, the first symbol is the first symbol in the second-type time unit. For details, refer to step S402. Details are not described herein again.

In another optional solution, the first device sends a sixth message to the another device.

Specifically, the sixth message includes index information of a resource whose time domain range is in the second-type time unit. The sixth message may be the fifth message, or may be physical-layer or higher-layer scheduling signaling for scheduling the service data of the first service type, or may be another type of message. This is not limited in this embodiment of this application. The resource may include a time domain resource or a time-frequency resource. The index information may be applied to at least one second-type time unit. Specifically, the at least one second-type time unit may include at least one first second-type time unit and/or at least one second second-type time unit. Further optionally, the resource is used to carry the service data of the first service type, and/or the resource is used to carry other possible data, and/or the resource is used to carry higher layer signaling.

It should be understood that the index information is different from absolute location information of the resource. When the index information is applied to different second-type time units, index ranges of the index information in the different second-type time units are different, and resources indicated by the index information are different.

In a design, the at least one second-type time unit includes at least one first second-type time unit, the first second-type time unit does not include the first symbol, and an index range of the index information in the first second-type time unit includes an $N^{th}$ symbol of the first second-type time unit. It may be understood that in a scenario in which the first second-type time unit does not include the first symbol used to carry specific information, the index range of the index information in the first second-type time unit includes the $N^{th}$ symbol. In this case, the $N^{th}$ symbol is not used as the first symbol.

In another design, the at least one second-type time unit includes at least one second second-type time unit, the second second-type time unit includes the first symbol, and an index range of the index information in the second-type time unit does not include an $N^{th}$ symbol of the second second-type time unit. It may be understood that in a scenario in which the second second-type time unit includes the first symbol used to carry specific information, the index range of the index information in the second second-type time unit does not include the $N^{th}$ symbol. In this case, $N^{th}$ symbol is used as the first symbol and does not belong to the index range of the index information.

The following provides more details.

In an optional implementation, the index range of the index information in the first second-type time unit does not include a symbol that is adjacent to a first guard period and before or after the first guard period in the first second-type time unit.

In another optional implementation, the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit, where W is a positive integer greater than or equal to 2.

According to the foregoing method, quantities of resources in the index ranges of the index information in the first second-type time unit and the second second-type time unit can be the same, thereby simplifying a design of the index information.

For example, when N=1, for the first second-type time unit, first index information indicates the first symbol, and for the second second-type time unit, the same first index information indicates the second symbol. Therefore, the first index information indicates different time domain resources in different second-type time units.

It should be noted herein that when all index information that may be configured by the first device is applied to a second-type time unit, a set of resources indicated by the index information may be referred to as an index range of the index information in the second-type time unit. For example, if the second-type time unit is a radio frame, an index range of the index information in the radio frame may be some time domain resources or some time-frequency resources whose time domain ranges are located in the radio frame. Index ranges of the index information in different types of second-type time units are different. For example, an index range of the index information in a second-type time unit including the first symbol is different from an index range of the index information in a second-type time unit not including the first symbol.

In an example, the index information may be resource index information in the second-type time unit, for example, an index number of a symbol in a radio frame.

In an optional design, a radio frame successively includes, in time domain, a first time domain resource, a first guard period GP, a second time domain resource, and a second guard period that are consecutive in time domain. Optionally, the first time domain resource is used to map a signal from the first device, and the second time domain resource is used to map a signal sent to the first device.

For example, a radio frame includes eight symbols: a symbol #0, a symbol #1, a symbol #2, a symbol #3, a symbol #4, a symbol #5, a symbol #6, and a symbol #7, and an index number is an integer ranging from 1 to 7. If a first radio frame corresponding to the index number is a radio frame not including the first symbol, for example, 6-*a* in FIG. 6, 6-*b* in FIG. 6, 6-*c* in FIG. 6, 6-*d* in FIG. 6, 6-*e* in FIG. 6, and 6-*f* in FIG. 6 represent radio frames not including the first symbol, and for example, the first symbol is the first symbol in the radio frame, an index range of the index information in the first radio frame is the symbol #0, the symbol #1, the symbol #3, the symbol #4, the symbol #5, the symbol #6, and the symbol #7. If the index information is an index number 2, the index information indicates the symbol #1 in the first radio frame. If a second radio frame corresponding to the index number is a radio frame including the first symbol, for example, 7-*b* in FIG. 7, 7-*c* in FIG. 7, and 7-*d* in FIG. 7 represent radio frames including the first symbol, an index range of the index information in the second radio frame is the symbol #1, the symbol #2, the symbol #3, the symbol #4, the symbol #5, the symbol #6, and the symbol

7. If the index information is an index number 2, the index information indicates the symbol #2 in the second radio frame.

It should be understood that, in this example, the index information may be information about one index number, or may be information about a plurality of index numbers. For example, the index information includes information about a plurality of index numbers. For example, a start index number P+a consecutive index length Q indicates Q consecutive index numbers starting from the index number P. For another example, a start index number+an end index number indicates all index numbers from the start index number to the end index number. For another example, the index information includes a plurality of index numbers. A specific manner in which the index information indicates one or more index numbers is not limited in the present invention.

In another example, the index information may be in a bitmap (bitmap) manner.

For example, a radio frame includes eight symbols: a symbol #0, a symbol #1, a symbol #2, a symbol #3, a symbol #4, a symbol #5, a symbol #6, and a symbol #7. Each symbol includes five frequency resources, an index range includes seven symbols, each symbol corresponds to five bits (bit), and each bit (bit) indicates one frequency domain resource on the symbol. Therefore, a bitmap (bitmap) of 35 (5×7) bits (bit) is shared to indicate corresponding resources in the second-type time unit. If a first radio frame corresponding to the index number is a radio frame not including the first symbol, for example, 6-*a* in FIG. 6, 6-*b* in FIG. 6, 6-*c* in FIG. 6, 6-*d* in FIG. 6, 6-*e* in FIG. 6, and 6-*f* in FIG. 6 represent radio frames not including the first symbol, an index range of the index information in the first radio frame is the symbol #0, the symbol #1, the symbol #3, the symbol #4, the symbol #5, the symbol #6, and the symbol #7, and a bitmap (bitmap) 00000 01000 00000 00000 00000 00000 00000 indicates the second frequency resource on the symbol #1 in the first radio frame. If a second radio frame corresponding to the bitmap (bitmap) is a radio frame including the first symbol, for example, 7-*b* in FIG. 7, 7-*c* in FIG. 7, and 7-*d* in FIG. 7 represent radio frames including the first symbol, an index range of the index information in the second radio frame is the symbol #1, the symbol #2, the symbol #3, the symbol #4, the symbol #5, the symbol #6, and the symbol #7, and the bitmap (bitmap) 00000 01000 00000 00000 00000 00000 00000 indicates the second frequency resource on the symbol #2 in the first radio frame.

It should be understood that the foregoing describes merely an example of a correspondence between the bitmap and the resource in the index range in this example. The correspondence between the bitmap and the resource in the index range in this example may alternatively be in another manner. This is not limited in the present invention.

In a possible example, the index information may be an index number of a symbol in a radio frame, the radio frame includes eight symbols: a symbol #0, a symbol #1, a symbol #2, a symbol #3, a symbol #4, a symbol #5, a symbol #6, and a symbol #7, and the index number is an integer ranging from 1 to 7. If a first radio frame corresponding to the index number is a radio frame not including the first symbol, for example, 6-*a* in FIG. 6, 6-*b* in FIG. 6, 6-*c* in FIG. 6, 6-*d* in FIG. 6, 6-*e* in FIG. 6, and 6-*f* in FIG. 6 represent radio frames not including the first symbol, namely, first second-type time units not including the first symbol, and for example, the first symbol is the first symbol in the first radio frame, an index range of the index information in the first radio frame is the symbol #0, the symbol #1, the symbol #3, the symbol #4, the symbol #5, the symbol #6, and the symbol #7. In other words, the index range of the index information in the first second-type time unit includes the first symbol of the first second-type time unit, namely, the symbol #0.

In an optional design, the index range of the index information in the first second-type time unit does not include a symbol that is adjacent to the first guard period and before or after the first guard period in the first second-type time unit.

It should be understood that the index range of the index information in the first second-type time unit may alternatively not include another symbol. For example, the index information may be an index number of a symbol in a radio frame, the radio frame includes eight symbols: a symbol #0, a symbol #1, a symbol #2, a symbol #3, a symbol #4, a symbol #5, a symbol #6, and a symbol #7, and the index number is an integer ranging from 1 to 7. If a first radio frame corresponding to the index number is a radio frame not including the first symbol, for example, 6-*a* in FIG. 6, 6-*b* in FIG. 6, 6-*c* in FIG. 6, 6-*d* in FIG. 6, 6-*e* in FIG. 6, and 6-*f* in FIG. 6 represent radio frames not including the first symbol, namely, first second-type time units not including the first symbol, for example, the first symbol is the first symbol in the first radio frame, and as shown in 6-*a* in FIG. 6, 6-*b* in FIG. 6, and 6-*d* in FIG. 6, the symbol #2 is before the first guard period, in 6-*a* in FIG. 6, 6-*b* in FIG. 6, and 6-*d* in FIG. 6, an index range of the index information in the first radio frame is the symbol #0, the symbol #1, the symbol #3, the symbol #4, the symbol #5, the symbol #6, and the symbol #7. In other words, the index range of the index information in the first second-type time unit does not include the symbol that is adjacent to the first guard period and before the first guard period in the first-type time unit, namely, the symbol #2. As shown in 6-*c* in FIG. 6, 6-*e* in FIG. 6, and 6-*f* in FIG. 6, the symbol #2 is after the first guard period. In this case, in 6-*c* in FIG. 6, 6-*e* in FIG. 6, and 6-*f* in FIG. 6, an index range of the index information in the first radio frame is the symbol #0, the symbol #1, the symbol #3, the symbol #4, the symbol #5, the symbol #6, and the symbol #7. In other words, the index range of the index information in the first second-type time unit does not include the symbol that is adjacent to the first guard period and after the first guard period in the first-type time unit, namely, the symbol #2.

In the foregoing examples, the radio frame with a basic uplink-downlink configuration ratio of 3:5 is used as an example, and a radio frame with another basic uplink-downlink configuration ratio may alternatively be used for description. When the radio frame with another basic uplink-downlink configuration ratio is used for description, a symbol that is adjacent to the first guard period and before or after the first guard period in the first second-type time unit is not the symbol #2. Specific descriptions are provided based on a specific case, and this is not limited in this method embodiment.

In another optional design, the index range of the index information in the first second-type time unit does not include a plurality of symbols that are adjacent to the first guard period and before or after the first guard period in the first second-type time unit.

For example, as shown in 6-*a* in FIG. 6, 6-*b* in FIG. 6, and 6-*d* in FIG. 6, the symbol #1 and the symbol #2 are before the first guard period. In this case, in 6-*a* in FIG. 6, 6-*b* in FIG. 6, and 6-*d* in FIG. 6, an index range of the index information in the first radio frame is the symbol #0, the symbol #3, the symbol #4, the symbol #5, the symbol #6, and the symbol #7. In other words, the index range of the index information in the first second-type time unit does not include the plurality of symbols that are adjacent to the first guard period and before the first guard period in the first second-type time unit, namely, the symbol #1 and the symbol #2.

For example, as shown in 6-e in FIG. 6, the symbol #1 and the symbol #2 are after the first guard period. In this case, in 6-e in FIG. 6, an index range of the index information in the first radio frame is the symbol #0, the symbol #3, the symbol #4, the symbol #5, the symbol #6, and the symbol #7. In other words, the index range of the index information in the first second-type time unit does not include the plurality of symbols that are adjacent to the first guard period and after the first guard period in the first second-type time unit, namely, the symbol #1 and the symbol #2.

In another optional design, the index range of the index information in the first second-type time unit does not include a symbol that is adjacent to the first guard period and before the first guard period and a symbol that is adjacent to the first guard period and after the first guard period in the first second-type time unit.

For example, as shown in 6-c in FIGS. 6 and 6-f in FIG. 6, the symbol #1 is before the first guard period, and the symbol #2 is after the first guard period. In this case, in 6-c in FIGS. 6 and 6-f in FIG. 6, an index range of the index information in the first radio frame is the symbol #0, the symbol #3, the symbol #4, the symbol #5, the symbol #6, and the symbol #7. In other words, the index range of the index information in the first second-type time unit does not include the symbol that is adjacent to the first guard period and before the first guard period and the symbol that is adjacent to the first guard period and after the first guard period in the first second-type time unit, namely, the symbol #1 and the symbol #2.

In another possible example, the index information may be an index number of a symbol in a radio frame, the radio frame includes eight symbols: a symbol #0, a symbol #1, a symbol #2, a symbol #3, a symbol #4, a symbol #5, a symbol #6, and a symbol #7, and the index number is an integer ranging from 1 to 7. If a second radio frame corresponding to the index number is a radio frame including the first symbol, for example, 7-b in FIG. 7, 7-c in FIG. 7, and 7-d in FIG. 7 represent radio frames including the first symbol, namely, second second-type time units including the first symbol, and for example, the first symbol is the first symbol in the second radio frame, an index range of the index information in the second radio frame is the symbol #1, the symbol #2, the symbol #3, the symbol #4, the symbol #5, the symbol #6, and the symbol #7. In other words, the index range of the index information in the second second-type time unit does not include the first symbol of the second-type time unit, namely, the symbol #0.

In an optional solution, the index range of the index information in the second second-type time unit does not include a symbol that is adjacent to a first guard period and before or after the first guard period in the second second-type time unit.

In an optional solution, the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit. For a detailed example, refer to a combination of the foregoing examples. Details are not described again.

It should be understood that the index range of the index information in the second second-type time unit may alternatively not include another symbol. For example, the index information may be an index number of a symbol in a radio frame, the radio frame includes eight symbols: a symbol #0, a symbol #1, a symbol #2, a symbol #3, a symbol #4, a symbol #5, a symbol #6, and a symbol #7, and the index number is an integer ranging from 1 to 6. If a second radio frame corresponding to the index number is a radio frame including the first symbol, for example, 7-b in FIG. 7, 7-c in FIG. 7, and 7-d in FIG. 7 represent radio frames including the first symbol, namely, second second-type time units including the first symbol, and for example, the first symbol is the first symbol in the second radio frame, an index range of the index information in the second radio frame may alternatively be the symbol #1, the symbol #3, the symbol #4, the symbol #5, the symbol #6, and the symbol #7. In other words, in addition to not including the first symbol of the second-type time unit, namely, the symbol #0, the index range of the index information in the second second-type time unit may further not include the symbol that is adjacent to the first guard period and before or after the first guard period in the second second-type time unit, namely, the symbol #2.

In the foregoing examples, the basic uplink-downlink configuration ratio being 3:5 is used as an example. The frame structure is determined based on the first rule, and descriptions are provided by using the frame structure as an example. Alternatively, a frame structure determined by using another basic uplink-downlink configuration ratio and another rule may be used for description. This is not limited in this embodiment of this application.

In the foregoing examples, an example in which the index information is an index number of a symbol in a radio frame is used for description. For a manner in which the index information is a bitmap (bitmap), information about a plurality of index numbers, or the like, an index range may be obtained by analogy, and details are not described again.

In an optional solution, N is equal to 1. In other words, the first symbol is the first symbol in the second-type time unit.

In an optional solution, the first device sends first configuration information to the another device.

Specifically, the first configuration information is used to indicate information about the second-type time unit including the first symbol, or the first configuration information is used to indicate information about the second-type time unit not including the first symbol. In other words, the first configuration information is used to indicate which second-type time units include the first symbol, or is used to indicate which second-type time units do not include the first symbol. Alternatively, the first device may not send the first configuration information to the another device, and information about a second-type time unit that includes or does not include the first symbol may be specified in a protocol.

In an optional solution, the first configuration information is used to indicate information about a quantity of second-type time units including the first symbol or information about a quantity of second-type time units including the first symbol in the first-type time unit. Alternatively, the first configuration information is used to indicate information about a quantity of second-type time units not including the first symbol or information about a quantity of second-type time units not including the first symbol in the first-type time unit.

In an example, it is assumed that a first-type time unit includes 48 second-type time units, and it may be considered that one superframe includes 48 consecutive radio frames. The first configuration information indicates that the quantity information of the second-type time units including the first symbol in the first-type time unit is 10. In other words, there are 10 radio frames including the first symbol in the 48 radio frames. A third rule is that a quantity of radio frames that is provided in the first configuration information is a quantity of radio frames including the first symbol. Correspondingly, after obtaining the first configuration information, the another device may determine, based on the third rule, that in one superframe, namely, 48 consecutive radio frames, the $1^{st}$ to the $10^{th}$ radio frames include the first symbol, and the $11^{th}$ to the $38^{th}$ radio frames do not include the first symbol.

According to the foregoing method, specific second-type time units including the first symbol may be determined based on the predefined rule and the quantity information of the second-type time units including the first symbol.

In an optional solution, the first device sends second configuration information to the another device, and the second configuration information indicates whether a resource used to transmit the service data of the first service type is included or whether a resource used to transmit the service data of the first service type is included on a first frequency resource. It may also be understood that the second configuration information indicates whether the resource used to transmit the service data of the first service type is configured or whether the resource used to transmit the service data of the first service type is configured on the first frequency resource. Specifically, the first frequency resource may be one or more carriers, subcarrier groups, subbands, frequency resource blocks (RB), or the like. Correspondingly, after obtaining the second configuration information, the another device may determine, by using the second configuration information, whether the resource used to transmit the service data of the first service type is included or whether the resource used to transmit the service data of the first service type is configured. Optionally, if the resource used to transmit the service data of the first service type is not included or the resource used to transmit the service data of the first service type is not configured, the first device does not need to send the fifth message to the another device on the sixth time-frequency resource. Alternatively, if the first frequency resource does not include the resource used to transmit the service data of the first service type or the resource used to transmit the service data of the first service type is not configured on the first frequency resource, the first device does not need to send the fifth message to the another device on the sixth time-frequency resource on the first frequency resource.

In another optional solution, a frequency domain resource of the sixth time-frequency resource includes all the valid frequency domain resources in the 20 megahertz bandwidth. For details, refer to step S402. Details are not described herein again.

Step 413: The another device receives the fifth message from the first device on the sixth time-frequency resource.

Specifically, the fifth message is used to indicate a resource for the service data of the first service type.

The first message, the second message, the third message, the scheduling information, and the fifth message are all sent by the first device to the another device in a unicast or multicast manner. The another device may be one or more devices. Content included in the first message, the second message, the third message, the scheduling information, and the fifth message is information configured by the first device for the another device. The following describes specific information exchange between the first device and the second device, namely, information exchange between the primary node and a secondary node. The second device may be a specific device in other devices.

In an optional solution, the first device sends a fourth message to the second device, where the fourth message is used to indicate the fifth resource, the fifth resource is used for a second control-type signal or second control-type signaling of the second device, and the second control-type signal or signaling includes:

one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second device; and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second device.

Specifically, the second control-type signal or signaling is specifically a signal or signaling transmitted between the first device and the second device, and that the fifth resource is used for the signal or signaling of the second device may mean that the first device sends the second control-type signal or signaling to the second device, and/or the first device receives the control-type signal or signaling from the second device. The acknowledgment feedback information may be positive acknowledgment (acknowledgment, ACK) feedback, and the negative acknowledgment feedback information may be negative acknowledgment (negative-acknowledgment, NACK) feedback. The phase tracking reference signal is used for phase tracking, the positioning reference signal is used for positioning, and the channel state information reference signal is used for channel state estimation. In an example, the fourth message is used to indicate the fifth resource, the fifth resource can be determined based on the fourth message, and the fifth resource is used by the first device to send the higher layer signaling to the second device. In another example, the fourth message is used to indicate the fifth resource, the fifth resource can be determined based on the fourth message, and the fifth resource is used by the first device to send the higher layer signaling to the second device and used by the first device to receive the channel feedback information from the second device.

The first device sends the fourth message to the second device, and the fourth message is used to indicate the resource of the second control-type signal or signaling of the second device. The first device directly configures the resource of the second control-type signal or signaling for the second device. In a manner of configuring the resource in the system, insufficiency or excessive waste of the resource is avoided, and flexibility of configuring the resource in the system is improved.

The methods in embodiments of the present invention are described in detail above, and apparatuses in embodiments of the present invention are provided below.

Figure 11:
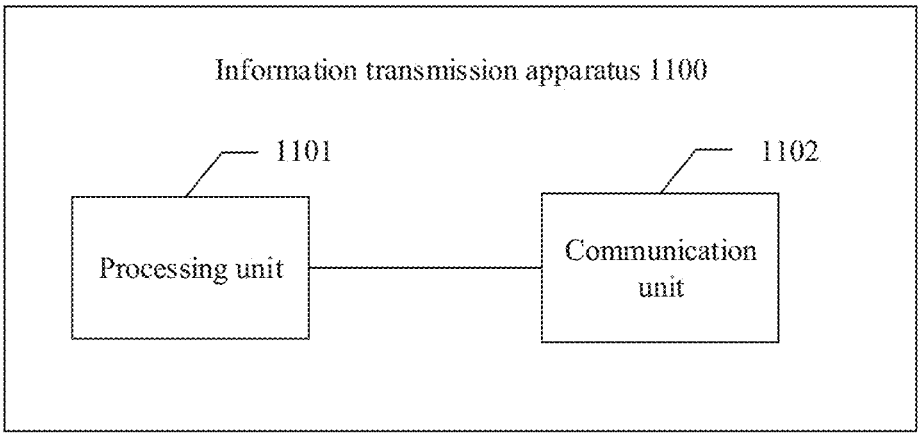
FIG. 11 is an information transmission apparatus according to an embodiment of the present invention.

Refer to FIG. 11. FIG. 11 is a schematic diagram of a structure of an information transmission apparatus according to an embodiment of the present invention. The information transmission apparatus may include a processing unit 1101 and a communication unit 1102. Detailed descriptions of the units are as follows: Optionally, the information transmission apparatus may be a first device, for example, a primary node or a CDC, or the information transmission apparatus may be a chip or an integrated circuit in a first device.

The processing unit 1101 is configured to send a first signal on a first time-frequency resource through the communication unit 1102 and a first antenna port, where the first signal is used for synchronization.

The communication unit 1102 is further configured to send a first message on a second time-frequency resource, where the first message includes time domain resource information and/or cyclic prefix length information of the second time-frequency resource.

The communication unit 1102 is further configured to send a second message on a third time-frequency resource.

In another optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the communication unit 1102 is further configured to send scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, size information of the scheduling information, symbol quantity information of the fourth time-frequency resource, aggregation level information of the scheduling information, or modulation and coding scheme information of the scheduling information.

In another optional solution, the communication unit 1102 is further configured to send a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by a first apparatus, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the communication unit 1102 is further configured to: send the first message on the second time-frequency resource through the first antenna port; and/or send the second message on the third time-frequency resource through the first antenna port; and/or send the scheduling information on the fourth time-frequency resource through the first antenna port; and/or send the third message on the fifth time-frequency resource through the first antenna port.

In another optional solution, the communication unit 1102 is further configured to send a fourth message to a second apparatus, where the fourth message is used to indicate a fifth resource, the fifth resource is used for a second control-type signal or second control-type signaling of the second apparatus, and the second control-type signal or signaling includes one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second apparatus, and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second apparatus.

In another optional solution, the communication unit 1102 is further configured to send a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, the communication unit 1102 is further configured to send a sixth message is sent, and the sixth message includes index information of a resource whose time domain range is in the second-type time unit. The resource may include a time domain resource or a time-frequency resource. The index information may be applied to at least one second-type time unit.

In another optional solution, the at least one second-type time unit includes at least one first second-type time unit, the first second-type time unit does not include the first symbol, and an index range of the index information in the first second-type time unit includes an $N^{th}$ symbol of the first second-type time unit.

In another optional solution, the at least one second-type time unit includes at least one second second-type time unit, the second second-type time unit includes the first symbol, and an index range of the index information in the second-type time unit does not include an $N^{th}$ symbol of the second second-type time unit.

Further optionally, the index range of the index information in the first second-type time unit does not include a symbol that is adjacent to a first guard period and before or after the first guard period in the first second-type time unit. Alternatively, the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit, where W is a positive integer greater than or equal to 2.

In another optional solution, N is equal to 1.

In another optional solution, the communication unit 1102 is further configured to send first configuration information, and the first configuration information is used to indicate information about the second-type time unit including the first symbol. Alternatively, the first configuration information is used to indicate information about the second-type time unit not including the first symbol.

In another optional solution, the first configuration information is used to indicate information about a quantity of second-type time units including the first symbol or information about a quantity of second-type time units including the first symbol in the first-type time unit.

In another optional solution, the communication unit 1102 is further configured to send second configuration information, and the second configuration information indicates whether a resource used to transmit the service data of the first service type is included or whether a resource used to transmit the service data of the first service type is included on a first frequency resource. It may also be understood that the second configuration information indicates whether the resource used to transmit the service data of the first service type is configured or whether the resource used to transmit the service data of the first service type is configured on the first frequency resource.

In another optional solution, the communication unit 1102 is further configured to: if the second configuration information indicates that the resource used to transmit the service data of the first service type is not included or the resource used to transmit the service data of the first service type is not included on the first frequency resource, skip sending the fifth message on the sixth time-frequency resource.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In an implementation, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, the location of the second symbol is determined by using a preset rule. In this manner, a specific rule type may not need to be indicated.

In another optional solution, the preset rule is the first rule or the second rule.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

It should be noted that, for implementations and beneficial effects of the units, refer to corresponding descriptions in the method embodiment shown in FIG. 4.

Figure 12:
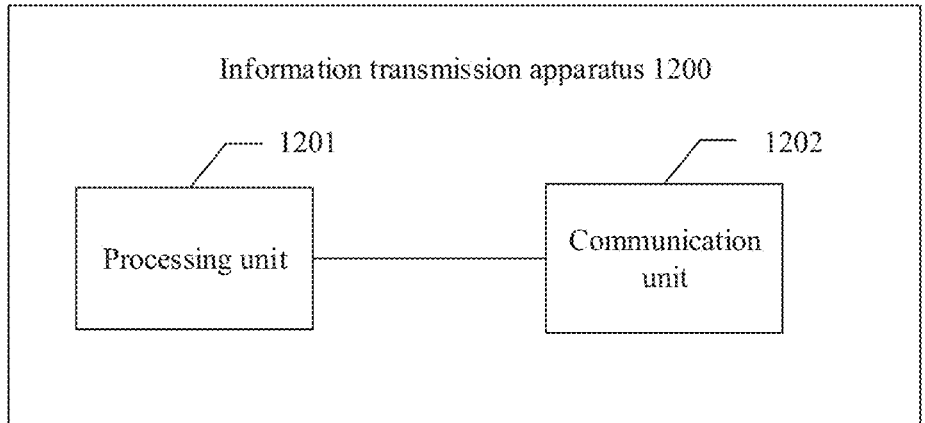
FIG. 12 is an information transmission apparatus according to an embodiment of the present invention.

Refer to FIG. 12. FIG. 12 is a schematic diagram of a structure of an information transmission apparatus according to an embodiment of the present invention. The information transmission apparatus may include a processing unit 1201 and a communication unit 1202. Detailed descriptions of the units are as follows: Optionally, the information transmission apparatus may be a second device, for example, a secondary node or an external node, or the information transmission apparatus may be a chip or an integrated circuit in a second device.

The processing unit 1201 is configured to receive a first signal on a first time-frequency resource through the communication unit 1202 and a first antenna port, where the first signal is used for synchronization.

The communication unit 1202 is configured to receive a first message on a second time-frequency resource, where the first message includes time domain resource information and/or cyclic prefix length information of the second time-frequency resource.

The communication unit 1202 is further configured to receive a second message on a third time-frequency resource.

In an optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the communication unit 1202 is further configured to receive scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the communication unit 1202 is further configured to receive a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from a first apparatus, and/or at least one of access request signaling or an access request signal, scheduling request signaling or a scheduling signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first apparatus.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the communication unit 1202 is further configured to determine a quantity of symbols in each second-type time unit based on a symbol quantity M of the second resource and a predefined rule, where the first-type time unit includes K second-type time units, and both M and K are positive integers.

In another optional solution, the predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

In another optional solution, the communication unit 1202 is further configured to: receive the first message on the second time-frequency resource through the first antenna port; and/or receive the second message on the third time-frequency resource through the first antenna port; and/or receive the scheduling information on the fourth time-frequency resource through the first antenna port; and/or receive the third message on the fifth time-frequency resource through the first antenna port.

In another optional solution, the communication unit 1202 is further configured to receive a fourth message from the first apparatus, where the fourth message is used to indicate a fifth resource, the fifth resource is used for a second control-type signal or second control-type signaling of a second apparatus, and the second control-type signal or signaling includes one or more of the synchronization signal, the acknowledgment/negative acknowledgment feedback information, the broadcast message, the system message, the physical layer control signaling, the higher layer signaling, the demodulation reference signal, the phase tracking reference signal, the positioning reference signal, and the channel state information reference signal from the first apparatus, and/or one or more of the access request signaling or signal, the scheduling request signaling or signal, the acknowledgment/negative acknowledgment feedback information, the channel feedback information, the physical layer control signaling, the higher layer signaling, the demodulation reference signal, the phase tracking reference signal, the positioning reference signal, and the channel sounding reference signal sent to the first apparatus.

In another optional solution, the communication unit 1202 is further configured to receive a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, the communication unit 1202 is further configured to receive a sixth message, and the sixth message includes index information of a resource whose time domain range is in the second-type time unit. The resource may include a time domain resource or a time-frequency resource. The index information may be applied to at least one second-type time unit. Specifically, the at least one second-type time unit may include at least one first second-type time unit and/or at least one second second-type time unit. Further optionally, the resource is used to carry the service data of the first service type, and/or the resource is used to carry other possible data, and/or the resource is used to carry higher layer signaling.

In another optional solution, the at least one second-type time unit includes at least one first second-type time unit, the first second-type time unit does not include the first symbol, and an index range of the index information in the first second-type time unit includes an $N^{th}$ symbol of the first second-type time unit.

In another optional solution, the at least one second-type time unit includes at least one second second-type time unit, the second second-type time unit includes the first symbol, and an index range of the index information in the second-type time unit does not include an $N^{th}$ symbol of the second second-type time unit.

Further optionally, the index range of the index information in the first second-type time unit does not include a symbol that is adjacent to a first guard period and before or after the first guard period in the first second-type time unit. Alternatively, the index range of the index information in the first second-type time unit does not include W symbols that are adjacent to a first guard period and before and/or after the first guard period in the first second-type time unit, and the index range of the index information in the second second-type time unit does not include W−1 symbols that are adjacent to a first guard period and before and/or after the first guard period in the second second-type time unit, where W is a positive integer greater than or equal to 2.

In another optional solution, N is equal to 1.

In another optional solution, the communication unit 1202 is further configured to receive first configuration information, and the first configuration information is used to indicate information about the second-type time unit including the first symbol. In this manner, the second-type time unit including the first symbol and the second-type time unit not including the first symbol may be quickly determined based on the first configuration information.

In another optional solution, the first configuration information is used to indicate information about a quantity of second-type time units including the first symbol or information about a quantity of second-type time units including the first symbol in the first-type time unit.

In another optional solution, the communication unit 1202 is further configured to receive second configuration information, and the second configuration information indicates whether a resource used to transmit the service data of the first service type is included or whether a resource used to transmit the service data of the first service type is included on a first frequency resource.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

It should be noted that, for implementations and beneficial effects of the units, refer to corresponding descriptions in the method embodiment shown in FIG. 4.

Figure 13:
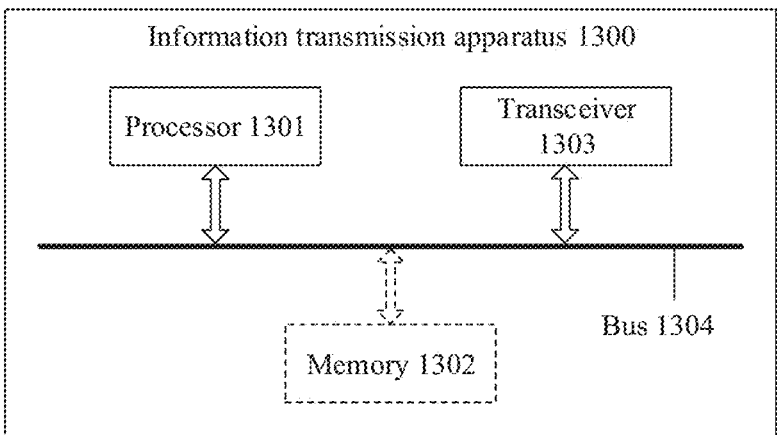
FIG. 13 is an information transmission apparatus according to an embodiment of the present invention.

Refer to FIG. 13. FIG. 13 is an information transmission apparatus 1300 according to an embodiment of the present invention. The apparatus 1300 includes at least one processor 1301 and a transceiver 1303. Optionally, a memory 1302 is further included. The processor 1301, the memory 1302, and the transceiver 1303 may be connected through a bus 1304 or in another possible connection manner. Optionally, the information transmission apparatus may be a first device, for example, a primary node or a CDC, or the information transmission apparatus may be a chip or an integrated circuit in a first device.

The memory 1302 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 1302 is configured to store related instructions and data. The transceiver 1303 is configured to receive and send data.

The processor 1301 may be one or more central processing units (central processing unit, CPU). When the processor 401 is one CPU, the CPU may be a single-core CPU or a multi-core CPU.

The processor 1301 in the apparatus 1300 reads computer program stored in the memory 1302, and is configured to perform the following operations:

sending a first signal on a first time-frequency resource through a first antenna port, where the first signal is used for synchronization;

sending a first message on a second time-frequency resource, where the first message includes time domain resource information and/or cyclic prefix length information of the second time-frequency resource; and sending a second message on a third time-frequency resource.

In another optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the processor 1301 is further configured to send scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the processor 1301 is further configured to send a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent by the first device, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first device.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the processor 1301 is further configured to: send the first message on the second time-frequency resource through the first antenna port; and/or send the second message on the third time-frequency resource through the first antenna port; and/or send the scheduling information on the fourth time-frequency resource through the first antenna port; and/or send the third message on the fifth time-frequency resource through the first antenna port.

In another optional solution, the processor 1301 is further configured to send a fourth message to a second device, where the fourth message is used to indicate a fifth resource, the fifth resource is used for a second control-type signal or second control-type signaling of the second device, and the second control-type signal or signaling includes one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, and a channel state information reference signal sent to the second device, and/or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, and a channel sounding reference signal from the second device.

In another optional solution, the processor 1301 is further configured to send a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, the processor 1301 is further configured to send a sixth message, and the sixth message includes index information of a resource whose time domain range is in the second-type time unit. The resource may include a time domain resource or a time-frequency resource. The index information may be applied to at least one second-type time unit. Specifically, the at least one second-type time unit may include at least one first second-type time unit and/or at least one second second-type time unit. Further optionally, the resource is used to carry the service data of the first service type, and/or the resource is used to carry other possible data, and/or the resource is used to carry higher layer signaling.

In another optional solution, the at least one second-type time unit includes at least one first second-type time unit, the first second-type time unit does not include the first symbol, and an index range of the index information in the first second-type time unit includes an $N^{th}$ symbol of the first second-type time unit.

In another optional solution, the at least one second-type time unit includes at least one second second-type time unit, the second second-type time unit includes the first symbol, and an index range of the index information in the second-type time unit does not include an $N^{th}$ symbol of the second second-type time unit.

Further optionally, the index range of the index information in the first second-type time unit does not include a symbol that is adjacent to a first guard period and before or after the first guard period in the first second-type time unit. Alternatively, the index range of the index information in the first second-type time unit does not include W symbols that are adjacent to a first guard period and before and/or after the first guard period in the first second-type time unit, and the index range of the index information in the second second-type time unit does not include W–1 symbols that are adjacent to a first guard period and before and/or after the first guard period in the second second-type time unit, where W is a positive integer greater than or equal to 2.

In another optional solution, N is equal to 1.

In another optional solution, the processor 1301 is further configured to send first configuration information, and the first configuration information is used to indicate information about the second-type time unit including the first symbol.

In another optional solution, the first configuration information is used to indicate information about a quantity of second-type time units including the first symbol or information about a quantity of second-type time units including the first symbol in the first-type time unit.

In another optional solution, the processor 1301 is further configured to send second configuration information, and the second configuration information indicates whether a resource used to transmit the service data of the first service type is included or whether a resource used to transmit the service data of the first service type is included on a first frequency resource.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In an implementation, the uplink/downlink resource configuration information includes a basic uplink-downlink configuration ratio, and the basic uplink-downlink configuration ratio indicates a ratio of a quantity of downlink symbols to a quantity of uplink symbols in the second-type time unit not including the first symbol and the second symbol.

In an implementation, the first rule is as follows:

In a second-type time unit, a quantity of symbols used for downlink transmission other than the first symbol and the second symbol is equal to a difference between a quantity of downlink symbols indicated by the basic uplink-downlink configuration ratio and a sum of a quantity of first symbols and a quantity of second symbols; and a quantity of symbols used for uplink transmission other than the first symbol and the second symbol is equal to a quantity of uplink symbols indicated by the basic uplink-downlink configuration ratio.

In another implementation, the second rule is as follows:

In a second-type time unit, a quantity of symbols used for uplink transmission other than the first symbol and the second symbol is equal to a difference between a quantity of uplink symbols indicated by the basic uplink-downlink configuration ratio and a sum of a quantity of first symbols and a quantity of second symbols; and a quantity of symbols used for downlink transmission other than the first symbol and the second symbol is equal to a quantity of downlink symbols indicated by the basic uplink-downlink configuration ratio.

In another optional solution, the location of the second symbol is determined by using a preset rule. In this manner, a specific rule type may not need to be indicated.

In another optional solution, the preset rule is the first rule or the second rule.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

It should be noted that, for implementations and beneficial effects of the operations, refer to corresponding descriptions in the method embodiment shown in FIG. 4.

Figure 14:
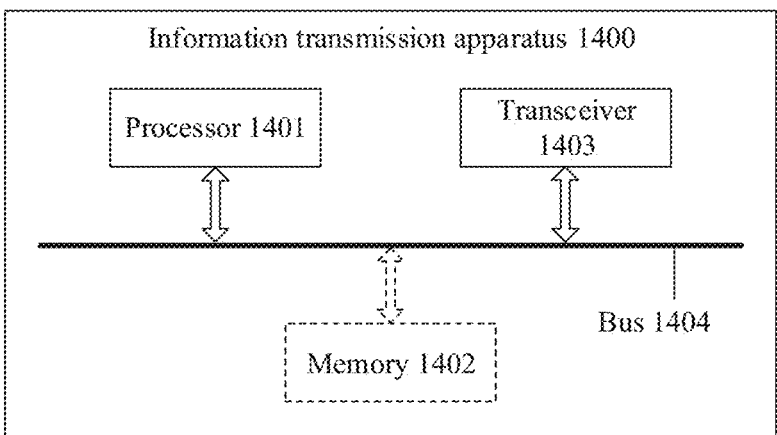
FIG. 14 is an information transmission apparatus according to an embodiment of the present invention.

Refer to FIG. 14. FIG. 14 is an information transmission apparatus 1400 according to an embodiment of the present invention. The apparatus 1400 includes at least one processor 1401 and a transceiver 1403. Optionally, a memory 1402 is further included. The processor 1401, the memory 1402, and the transceiver 1403 are connected to each other through a bus 1404. Optionally, the information transmission apparatus may be a second device, for example, a secondary node or an external node, or the information transmission apparatus may be a chip or an integrated circuit in a second device.

The memory 1402 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 1402 is configured to store related instructions and data. The transceiver 1403 is configured to receive and send data.

The processor 1401 may be one or more central processing units (central processing unit, CPU). When the processor 401 is one CPU, the CPU may be a single-core CPU or a multi-core CPU.

The processor 1401 in the apparatus 1400 reads computer program stored in the memory 1402, and is configured to perform the following operations:

receiving a first signal on a first time-frequency resource through a first antenna port, where the first signal is used for synchronization;

receiving a first message on a second time-frequency resource, where the first message includes time domain resource information and/or cyclic prefix length information of the second time-frequency resource; and receiving a second message on a third time-frequency resource.

In an optional solution, the second message includes system identifier information and/or information about a first resource, and the first resource is used to bear an access request.

In another optional solution, the first message includes at least one of the following: information about the third time-frequency resource, symbol quantity information of the third time-frequency resource, period information of the second message, size information of the second message, or modulation and coding scheme information of the second message.

In another optional solution, the processor 1401 is further configured to receive scheduling information on a fourth time-frequency resource, where the scheduling information includes at least one of the following: the information about the third time-frequency resource, the symbol quantity information of the third time-frequency resource, the period information of the second message, the size information of the second message, or the modulation and coding scheme information of the second message.

In another optional solution, the first message includes at least one of the following: information about the fourth time-frequency resource, symbol quantity information of the fourth time-frequency resource, size information of the scheduling information, aggregation level information of the scheduling information, or modulation and coding scheme information of the scheduling information.

In another optional solution, the processor 1401 is further configured to receive a third message on a fifth time-frequency resource, where the third message is used to indicate a second resource, and the second resource is used to transmit at least one of a first control-type signal or first control-type signaling.

In another optional solution, the first message includes information used to indicate a third resource, and/or the second message includes information used to indicate a fourth resource, and the third resource and/or the fourth resource are/is used to transmit at least one of the first control-type signal or signaling.

In another optional solution, the first control-type signal or signaling includes at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from a first device, and/or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first device.

In another optional solution, a time domain resource of the second resource is located in a first-type time unit, and the third message includes symbol quantity information of the second resource; and/or a time domain resource of the third resource and/or a time domain resource of the fourth resource are/is located in a first-type time unit, and the first message includes symbol quantity information of the third resource, and/or the second message includes symbol quantity information of the fourth resource.

In another optional solution, the processor 1401 is further configured to determine a quantity of symbols in each second-type time unit based on a symbol quantity M of the second resource and a predefined rule, where the first-type time unit includes K second-type time units, and both M and K are positive integers.

In another optional solution, the predefined rule is as follows: It is assumed that M exactly divided by K is equal to X, with a remainder of Y. In this case, there are X+1 symbols in first (or last) Y second-type time units in a first-type time unit, and there are X symbols in a $(Y+1)^{th}$ time unit to a $K^{th}$ time unit.

In another optional solution, the processor 1401 is further configured to: receive the first message on the second time-frequency resource through the first antenna port; and/or receive the second message on the third time-frequency resource through the first antenna port; and/or receive the scheduling information on the fourth time-frequency resource through the first antenna port; and/or receive the third message on the fifth time-frequency resource through the first antenna port.

In another optional solution, the processor 1401 is further configured to receive a fourth message from the first device, where the fourth message is used to indicate a fifth resource, the fifth resource is used for a second control-type signal or second control-type signaling of a second device, and the second control-type signal or signaling includes one or more of the synchronization signal, the acknowledgment/negative acknowledgment feedback information, the broadcast message, the system message, the physical layer control signaling, the higher layer signaling, the demodulation reference signal, the phase tracking reference signal, the positioning reference signal, and the channel state information reference signal from the first device, and/or one or more of the access request signaling or signal, the scheduling request signaling or signal, the acknowledgment/negative acknowledgment feedback information, the channel feedback information, the physical layer control signaling, the higher layer signaling, the demodulation reference signal, the phase tracking reference signal, the positioning reference signal, and the channel sounding reference signal sent to the first device.

In another optional solution, the processor 1401 is further configured to receive a fifth message on a sixth time-frequency resource, where the fifth message is used to indicate a resource used for service data of a first service type.

In another optional solution, the fifth message is used to indicate a frequency domain resource that is in each symbol of a second-type time unit and that is used for the service data of the first service type.

In another optional solution, the first message includes at least one of the following: information about the sixth time-frequency resource, symbol quantity information of the sixth time-frequency resource, period information of the fifth message, size information of the fifth message, or modulation and coding scheme information of the fifth message.

In another optional solution, a time domain resource corresponding to at least one of the first time-frequency resource, the second time-frequency resource, the third time-frequency resource, the fourth time-frequency resource, the fifth time-frequency resource, or the sixth time-frequency resource includes one or more first symbols, the first symbol is an $N^{th}$ symbol in a second-type time unit, and N is a positive integer.

In another optional solution, the processor 1401 is further configured to receive a sixth message, and the sixth message includes index information of a resource whose time domain range is in the second-type time unit. The resource may include a time domain resource or a time-frequency resource. The index information may be applied to at least one second-type time unit. Specifically, the at least one second-type time unit may include at least one first second-type time unit and/or at least one second second-type time unit. Further optionally, the resource is used to carry the service data of the first service type, and/or the resource is used to carry other possible data, and/or the resource is used to carry higher layer signaling.

In another optional solution, a time domain resource of at least one of the first resource, the second resource, the third resource, the fourth resource, the fifth resource, or the sixth resource includes one or more second symbols, and the second symbol is a last symbol or a plurality of last consecutive symbols used for downlink transmission and/or a first symbol or a plurality of first consecutive symbols used for uplink transmission in the second-type time unit.

In another optional solution, the first message, the second message, and/or the third message include/includes first information. The first information may be used to indicate a location of the second symbol and/or a structure of the second-type time unit. Optionally, the first information includes rule indication information, and the rule indication information is used to indicate at least one of a plurality of rules. The plurality of rules include a first rule or a second rule.

In another optional solution, the first message, the second message, and/or the third message include/includes uplink/downlink resource configuration information.

In another optional solution, a frequency domain resource of at least one of the first time-frequency resource, the second time-frequency resource, the third time-frequency resource, the fourth time-frequency resource, the fifth time-frequency resource, or the sixth time-frequency resource includes all valid frequency domain resources in a 20 megahertz bandwidth.

In another optional solution, the first message is a broadcast message and/or the second message is a system message.

It should be noted that, for implementations and beneficial effects of the operations, refer to corresponding descriptions in the method embodiment shown in FIG. 4.

An embodiment of the present invention further provides a chip, where the chip includes at least one processor and an interface circuit, and the interface circuit is configured to provide instructions and/or data for the at least one processor. When executing the instructions, the at least one processor may implement a method process on a first device side or another device side. For a specific method process, refer to FIG. 4 and the descriptions of FIG. 4. Optionally, the chip further includes a memory. The memory, the transceiver, and the at least one processor are interconnected through a line, and the at least one memory stores a computer program.

An embodiment of the present invention further provides a computer-readable storage medium. The computer-readable storage medium stores a computer program. When the computer program is executed by the processor, the method process shown in FIG. 4 is implemented.

An embodiment of the present invention further provides a computer program product. When the computer program product runs, the method process shown in FIG. 4 is implemented.

An embodiment of the present invention further provides a communication system, including the first device and at least one second device.

An embodiment of this application further provides a terminal. The terminal may be a transportation vehicle or an intelligent device. The transportation vehicle or the intelligent device includes at least one of the information transmission apparatus shown in FIG. 11 or FIG. 13 and the information transmission apparatus shown in FIG. 12 or FIG. 14.

For example, the terminal may be a smart home device, an intelligent wearable device, an uncrewed aerial vehicle, an unmanned transport vehicle, an automobile, a robot, or the like.

In a possible implementation, the terminal is a vehicle, and includes at least one of the information transmission apparatus shown in FIG. 11 or FIG. 13 and the information transmission apparatus shown in FIG. 12 or FIG. 14 in the foregoing embodiments of this application.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. An information transmission method, comprising:
    sending a first synchronization signal on a first time-frequency resource through a antenna port;
    sending a broadcast message on a second time-frequency resource, wherein the broadcast message comprises at least one of time domain resource information or cyclic prefix length information of the second time-frequency resource; and
    sending a system message on a third time-frequency resource, wherein the system message comprises at least one of system identifier information or information about a first resource for carrying an access request.

2. The method according to claim 1, wherein the method further comprises:
    sending scheduling information on a fourth time-frequency resource, wherein the scheduling information comprises at least one of the following:
    information about the third time-frequency resource;

symbol quantity information of the third time-frequency resource;

period information of the system message;

size information of the system message; or modulation and coding scheme information of the system message.

3. The method according to claim 2, wherein the broadcast message comprises at least one of the following:

information about the fourth time-frequency resource;

symbol quantity information of the fourth time-frequency resource;

size information of the scheduling information;

aggregation level information of the scheduling information; or modulation and coding scheme information of the scheduling information.

4. The method according to claim 2, wherein at least one of the following occurs:

the sending a broadcast message on a second time-frequency resource comprises:

sending the broadcast message on the second time-frequency resource through the first antenna port; or the sending a system message on a third time-frequency resource comprises:

sending the system message on the third time-frequency resource through the first antenna port; or the sending scheduling information on a fourth time-frequency resource comprises:

sending the scheduling information on the fourth time-frequency resource through the first antenna port.

5. The method according to claim 1, wherein the method further comprises:

sending a third message on a fifth time-frequency resource, wherein the third message indicates a second resource for transmitting at least one of a first control-type signal or first control-type signaling.

6. The method according to claim 5, wherein the first control-type signal or signaling comprises:

at least one of a synchronization signal, acknowledgment/ negative acknowledgment feedback information, a broadcast message, a system message, physical layer control signaling, higher layer signaling, a demodulation reference signal, a phase tracking reference signal, a positioning reference signal, or a channel state information reference signal sent by a first device, or at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal received by the first device.

7. The method according to claim 5, wherein at least one of the following occurs:

a time domain resource of the second resource is located in a first-type time unit, and the third message comprises symbol quantity information of the second resource; or a time domain resource of the third time-frequency resource is located in a first-type time unit, and the broadcast message comprises symbol quantity information of the third time-frequency resource.

8. The method according to claim 1, wherein the method further comprises:

sending a fourth message to a second device, wherein the fourth message indicates a fifth resource for transmitting a second control-type signal or second control-type signaling of the second device, and the second control-type signal or signaling comprises:

one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal sent to the second device; or one or more of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal from the second device.

9. The method according to claim 1, wherein a time domain resource of at least one of the first time-frequency resource, the second time-frequency resource, or the third time-frequency resource comprises one or more second symbols, and each of the one or more second symbols is at least one of a last symbol or a plurality of last consecutive symbols for downlink transmission or a first symbol or a plurality of first consecutive symbols for uplink transmission in a second-type time unit.

10. The method according to claim 9, wherein at least one of the broadcast message or the system message comprises first information, and the first information indicates at least one of a location of the second symbol or a structure of the second-type time unit.

11. The method according to claim 1, wherein at least one of the broadcast message or the system message comprises uplink/downlink resource configuration information.

12. The method according to claim 1, wherein a frequency domain resource of at least one of the first time-frequency resource, the second time-frequency resource, or the third time-frequency resource comprises valid frequency domain resources in a 20 megahertz bandwidth.

13. An information transmission method, comprising:

receiving a first synchronization signal on a first time-frequency resource through a first antenna port;

receiving a broadcast message on a second time-frequency resource, wherein the broadcast message comprises at least one of time domain resource information or cyclic prefix length information of the second time-frequency resource; and receiving a system message on a third time-frequency resource, wherein the system message comprises at least one of system identifier information or information about a first resource for carrying an access request.

14. The method according to claim 13, wherein the method further comprises:

receiving scheduling information on a fourth time-frequency resource, wherein the scheduling information comprises at least one of the following:

information about the third time-frequency resource;

symbol quantity information of the third time-frequency resource;

period information of the system message;

size information of the system message; or
modulation and coding scheme information of the system message.

15. The method according to claim 14, wherein the broadcast message comprises at least one of the following:
information about the fourth time-frequency resource;
symbol quantity information of the fourth time-frequency resource;
size information of the scheduling information;
aggregation level information of the scheduling information; or
modulation and coding scheme information of the scheduling information.

16. The method according to claim 14, wherein at least one of the following occurs:
the receiving a broadcast message on a second time-frequency resource comprises:
receiving the broadcast message on the second time-frequency resource through the first antenna port;
or
the receiving a system message on a third time-frequency resource comprises:
receiving the system message on the third time-frequency resource through the first antenna port;
or
the receiving scheduling information on a fourth time-frequency resource comprises:
receiving the scheduling information on the fourth time-frequency resource through the first antenna port.

17. The method according to claim 13, wherein the method further comprises:
receiving a third message on a fifth time-frequency resource, wherein the third message indicates a second resource for transmitting at least one of a first control-type signal or first control-type signaling.

18. The method according to claim 17, wherein the first control-type signal or signaling comprises:
at least one of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from a first device; or
at least one of access request signaling or an access request signal, scheduling request signaling or a scheduling request signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first device.

19. The method according to claim 17, wherein at least one of the following occurs:
a time domain resource of the second resource is located in a first-type time unit, and the third message comprises symbol quantity information of the second resource; or
a time domain resource of the third time-frequency resource is located in a first-type time unit, and the broadcast message comprises symbol quantity information of the third time-frequency resource.

20. The method according to claim 13, wherein the method further comprises:

receiving a fourth message from a first device, wherein the fourth message indicates a fifth resource for transmitting a second control-type signal or second control-type signaling of a second device, and the second control-type signal or signaling comprises:
one or more of a synchronization signal, acknowledgment/negative acknowledgment feedback information, a broadcast message, a system message, physical layer control signaling, higher layer signaling, a demodulation reference signal, a phase tracking reference signal, a positioning reference signal, or a channel state information reference signal from the first device; or
one or more of access request signaling or signal, scheduling request signaling or signal, acknowledgment/negative acknowledgment feedback information, channel feedback information, physical layer control signaling, higher layer signaling, a demodulation reference signal, a phase tracking reference signal, a positioning reference signal, or a channel sounding reference signal sent to the first device.

21. The method according to claim 13, wherein a time domain resource of at least one of the first time-frequency resource, the second time-frequency resource, or the third time-frequency resource comprises one or more second symbols, and each of the one or more second symbols is at least one of a last symbol or a plurality of last consecutive symbols for downlink transmission or a first symbol or a plurality of first consecutive symbols for uplink transmission in a second-type time unit.

22. The method according to claim 21, wherein at least one of the broadcast message or the system message comprises first information, and the first information indicates at least one of a location of the second symbol or a structure of the second-type time unit.

23. The method according to claim 22, wherein at least one of the broadcast message or the system message comprises uplink/downlink resource configuration information.

24. The method according to claim 13, wherein a frequency domain resource of at least one of the first time-frequency resource, the second time-frequency resource, or the third time-frequency resource comprises valid frequency domain resources in a 20 megahertz bandwidth.

25. An information transmission apparatus, comprising:
a transmitter;
at least one processor; and
one or more memories coupled to the at least one processor and storing programming instructions for execution by the at least one processor to cause the apparatus to:
send, through the transmitter, a first synchronization signal on a first time-frequency resource through a first antenna port, wherein
send, through the transmitter, a broadcast message on a second time-frequency resource, wherein the broadcast message at least one of time domain resource information or cyclic prefix length information of the second time-frequency resource; and
send, through the transmitter, a system message on a third time-frequency resource, wherein the system message comprises at least one of system identifier information or information about a first resource for carrying an access request.

* * * * *